United States Patent
Kawabata et al.

(10) Patent No.: US 9,633,287 B2
(45) Date of Patent: Apr. 25, 2017

(54) COLOR INFORMATION PROCESSING METHOD, COLOR INFORMATION PROCESSING APPARATUS, AND COLOR INFORMATION PROCESSING SYSTEM

(71) Applicant: PROSPER CREATIVE CO., LTD., Tokyo (JP)

(72) Inventors: Hideki Kawabata, Tokyo (JP); Akira Kijima, Tokyo (JP)

(73) Assignee: PROSPER CREATIVE CO., LTD., Tokyo (JP)

( * ) Notice: Subject to any disclaimer, the term of this patent is extended or adjusted under 35 U.S.C. 154(b) by 0 days.

(21) Appl. No.: 14/739,901

(22) Filed: Jun. 15, 2015

(65) Prior Publication Data

US 2015/0278646 A1 Oct. 1, 2015

Related U.S. Application Data

(62) Division of application No. 13/991,771, filed as application No. PCT/JP2011/078354 on Dec. 7, 2011, now Pat. No. 9,087,274.

(30) Foreign Application Priority Data

Dec. 7, 2010 (JP) ................................. 2010-272369

(51) Int. Cl.
*H04N 1/40* (2006.01)
*G06K 15/02* (2006.01)
(Continued)

(52) U.S. Cl.
CPC ............. *G06K 15/025* (2013.01); *H04N 1/60* (2013.01); *H04N 1/6047* (2013.01);
(Continued)

(58) Field of Classification Search
CPC .... H04N 1/6033; H04N 1/6058; H04N 1/603; H04N 1/62; H04N 1/6027; H04N 1/628;
(Continued)

(56) References Cited

U.S. PATENT DOCUMENTS 7,023,581 B2   4/2006   Soler et al.
7,130,076 B2   10/2006  Shibuya et al.
(Continued)

FOREIGN PATENT DOCUMENTS

EP   1279501      1/2003
JP   10 329307 A  12/1998
(Continued)

OTHER PUBLICATIONS

U.S. Appl. No. 13/991,771, filed Jun. 5, 2013 in the name of Kawabata et al.
(Continued)

*Primary Examiner* — Thomas D Lee
*Assistant Examiner* — Stephen Brinich
(74) *Attorney, Agent, or Firm* — Oliff PLC

(57) ABSTRACT

A color information processing method includes: inputting reference data including color information about each pixel or each pixel group of a reference medium and evaluation target data including color information about each pixel or each pixel group of an evaluation medium by an input means; performing an image matching process of image matching the input reference data and evaluation target data; setting a specific area which is a unit of evaluation and includes a plurality of pixels to each data item subjected to the image matching process; and comparing the color information items about each pixel or each pixel group in the reference data and the evaluation target data in the set specific area to calculate a color difference and performing (Continued)

an averaging process to calculate an average evaluation result for the specific area by a calculation means.

10 Claims, 16 Drawing Sheets

(51) Int. Cl.
    *H04N 1/60*     (2006.01)
    *H04N 1/62*     (2006.01)

(52) U.S. Cl.
    CPC ......... *H04N 1/6055* (2013.01); *H04N 1/6058* (2013.01); *H04N 1/62* (2013.01)

(58) Field of Classification Search
    CPC   H04N 9/643; H04N 1/60; H04N 1/54; H04N 1/6055; H04N 9/3182; H04N 9/73; H04N 5/2254; H04N 1/6077; H04N 5/225; H04N 5/2251
    USPC ......... 358/1.9, 2.1, 468, 504, 406, 400, 500, 358/527, 515, 518
    See application file for complete search history.

(56) References Cited

U.S. PATENT DOCUMENTS

| | | |
|---|---|---|
| 7,486,414 B2 | 2/2009 | Arai |
| 7,542,168 B2 | 6/2009 | Goma et al. |
| 8,437,040 B2 | 5/2013 | Taylor et al. |
| 2003/0210413 A1 | 11/2003 | Takeda et al. |
| 2006/0192996 A1 | 8/2006 | Yamamoto et al. |
| 2007/0216918 A1 | 9/2007 | Honeck et al. |
| 2010/0165118 A1 | 7/2010 | Honeck et al. |

FOREIGN PATENT DOCUMENTS

| | | |
|---|---|---|
| JP | 2001 018364 A | 1/2001 |
| JP | 2003/034015 A | 2/2003 |
| JP | 2003 326678 A | 11/2003 |
| JP | 3762169 B2 | 4/2006 |
| JP | 2006 229402 A | 8/2006 |
| JP | 2008/114465 A | 5/2008 |

OTHER PUBLICATIONS

Jul. 2, 2014 Office Action issued in U.S. Appl. No. 13/991,771.
Dec. 17, 2014 Final Office Action issued in U.S. Appl. No. 13/991,771.
Mar. 13, 2015 Notice of Allowance issued in U.S. Appl. No. 13/991,771.
Jan. 24, 2012 International Preliminary Report on Patentability issued in International Application No. PCT/JP2011/078354.
Jan. 24, 2012 International Search Report issued in International Application No. PCT/JP2011/078354.
Oct. 10, 2016 Search Report issued in European Patent Application No. 11847653.0.

IMAGE OF AREA OF INTEREST
OBTAINED BY IMAGING PROOF
SHEET AND PRINTED MATTER

MATRIX OBTAINED BY
DIVIDING AREA OF
INTEREST OF IMAGE

SIMULATION OF CHANGE IN AMOUNT OF INK AND DOT GAIN

EXAMPLE OF COLOR REPRODUCTION GAMUT OF
VARIOUS KINDS OF MEDIA IN CIEXYZ CHROMATICITY DIAGRAM

COLOR INFORMATION PROCESSING METHOD, COLOR INFORMATION PROCESSING APPARATUS, AND COLOR INFORMATION PROCESSING SYSTEM

This is a Divisional of U.S. application Ser. No. 13/991,771 filed Jun. 5, 2013, which is a National Stage of International Application No. PCT/JP2011/078354 filed Dec. 7, 2011 which claims priority to JP 2010-272369 filed Dec. 7, 2010. The prior applications, including the specifications, drawings and abstract are incorporated herein by reference in their entirety.

TECHNICAL FIELD

The present invention relates to a color information processing method, a color information processing apparatus, and a color information processing system that measure (color measurement) the colors of the same portion of the images of a reference medium (reference printed matter) and an evaluation medium (comparative printed matter) on based on image information of the reference medium and the evaluation medium and compare and evaluate the colors.

In addition, the present invention relates to a color information processing method, a color information processing apparatus, and a color information processing system that derive information about an output apparatus to be adjusted using a means for adjusting a color difference between a reference medium and an evaluation medium based on the evaluation result and adjust the output apparatus.

Furthermore, the present invention relates to a color information processing method, a color information processing apparatus, and a color information processing system that measure the colors of objects (media), such as a printed matter and a product having images including, for example, a color area, a picture, a photograph, a character, and a painting formed by a plurality of color materials, compare the colors, and perform color matching.

TECHNICAL BACKGROUND

It is very important to correctly transmit information including the colors of various goods, products, and works of art to the third party through a printed matter or the Internet. In general, in the printed matter, for example, an image is formed by color materials of four or more colors including cyan (C), magenta (M), and yellow (Y), which are the three primary colors in subtractive color mixing, and a black (K) ink.

In general offset printing, a printing plate, such as an aluminum plate with a smooth surface, is used. Ink is attached to a lipophilic printing element of the plate and dampening solution is attached to a hydrophilic non-printing element to prevent the ink from attaching. An ink supply roller and a dampening solution roller come into contact with a plate cylinder and ink is supplied following water. Therefore, ink is stably attached only to the printing element.

The ink supply roller is a mechanism configured by combining a plurality of rollers and ink is supplied from an ink fountain storing ink to the ink supply roller. Therefore, for example, a large amount of ink is used in a portion of the printed matter including a large area of images and a small amount of ink is used in a portion including a small area of images. In some cases, even when a constant amount of ink is supplied, the density of the color varies depending on images.

An ink key is provided between the ink fountain and the ink supply roller and controls width of the gap from the ink fountain. In addition, an ink fountain roller which comes into contact with the ink key is rotated at a constant rpm during printing to supply ink from the ink fountain. The number of rotations of the ink fountain roller is changed to control the flow rate of ink from the ink fountain to the ink supply roller for the entire printing surface. The number of ink keys varies depending on a printing press, and about 20 to 30 ink keys are generally provided. The flow rate of ink can be independently controlled.

In the printing process, in order to make a reference color proof, a proof output is performed several times by a printing press or an electronic printer. Until a desired color is reproduced, adjustment, such as color correction, is performed and a final contract proof is made.

In a case of proof, color reproduction is greatly changed depending on a proof manufacturer or the type of machine, in addition to the color of the color material of a proofer (color proof output device). In some cases, a change of color occurs in a printing environment due to, for example, a difference in the printing speed or the amount of dampening solution in a printing stage, even in a press proof on the printing press.

In the color matching of the printing press according to the related art, the operator visually compares a proof print or a proof sheet with a printed test sheet. The operator adjusts the amount of ink according to the color reproduction of the picture such that the color of the printed test sheet is close to the color of the final contract proof, based on the comparison result. However, this method greatly depends on the workmanship of the operator and the occurrence of a color difference is inevitable due to the differences among the operators.

A technique has been proposed in which a control strip, which is a kind of color chart including solid patches of C, M, Y, and K inks, is printed outside the image of the printed matter, the color of the control strip is measured by a color measurement means, such as a spectrophotometer, and the amount of ink supplied is managed based on the measurement result such that the density of ink is uniform.

However, in this case, since printing is a physical phenomenon, it is difficult to automate control for the ink fountain. In addition, since there is gradation or a background pattern in the color of a printing picture, which will be a product, it is difficult to stably measure the color with the color measurement device, as compared to the control strip. Furthermore, since there is no means for managing the color of the picture, the color adjustment of the picture of the printed matter depends on the experience or color sense of the printing operator or the color administrator.

In order to solve the above-mentioned problems, a technique has been proposed in which point color measurement (spot area color measurement) using a spot with a diameter of about 3 mm is performed to measure the color of an image and the measurement result is reflected in the amount of ink supplied. For example, Patent Document 1 discloses a technique which measures the color of a control point in a printed matter, controls the supply amount of color inks which are used at the control point based on the measured value, and controls the supply amount of other inks using a control strip.

PRIOR ART DOCUMENT

Patent Document

Patent Document 1: Japanese Patent No. 3762169

SUMMARY OF THE INVENTION

Problem to be Solved by the Invention

However, in the spot area color measurement according to the related art, since the color of one point in an object to be measured is compared and analyzed, it is difficult to strictly perform color measurement at the same position of the image. For example, a flat image without shading or a shape is preferable. However, when an image has, for example, shading or a shape, color measurement is affected by the slight shift of a measurement position. As a result, in some cases, it is difficult to perform good color matching. Therefore, in the spot area color measurement, an image, such as a printing picture, is not measured, but the color of a control strip in which color patches with a size of about 5 mm×5 mm are printed is measured.

A color measurement means according to the related art which performs spot area color measurement performs numerical conversion into the measured color into a color which is measured in the spectral distribution of a desired color temperature, such as D50 (5000 K), of a color evaluation light, using an ideal light source which is calculated from the spectral characteristics of, for example, a halogen lamp or a xenon lamp with the calculated value. Therefore, the colorimetric value is not necessarily matched with the visual evaluation result.

The present invention has been made to solve the above-mentioned problems and an object of the invention is to provide a color information processing method and a color information processing apparatus capable of measuring the colors of the same portion of the images of a reference medium and an evaluation medium based on image information of the reference medium and the evaluation medium and comparing and evaluating the colors.

In addition, another object of the present invention is to provide a color information processing method, a color information processing apparatus, and a color information processing system capable of deriving information about an output apparatus to be adjusted using a means for adjusting a color difference between a reference medium and an evaluation medium based on the evaluation result and adjusting the output apparatus.

Furthermore, still another object of the present invention is to provide a color information processing method, a color information processing apparatus, and a color information processing system capable of measuring the colors of media including images formed by a plurality of color materials, comparing the colors, and performing color matching to accurately and reliably match the colors when the colors are visually evaluated, without depending on the subjective view of the operator.

Means for Solving the Problem

A color information processing method according to the present invention includes: inputting reference data including color information about each pixel or each pixel group of a reference medium and evaluation target data including color information about each pixel or each pixel group of an evaluation medium by an input means; performing an image matching process of image matching the input reference data and evaluation target data by an image processing means such that pixel levels thereof correspond to each other; setting a specific area which is a unit of evaluation and includes a plurality of pixels to each data item subjected to the image matching process by an area setting means; and comparing the color information items about each pixel or each pixel group in the reference data and the evaluation target data in the set specific area to calculate a color difference and performing an averaging process to calculate an average evaluation result for the specific area by a calculation means.

In an embodiment of the present invention, at least one of the color information of the reference data and the color information of the evaluation target data may be a spectral value, an L*a*b* value, an RGB value, a CMYK value, an XYZ value, a density value, a Munsell display value, an infrared wavelength, an ultraviolet wavelength, or an X-ray wavelength as a color measurement result obtained by measuring the color of a printed matter, a light emitting surface, or an object in a pixel unit or a pixel group unit using the input means.

According to this structure, since the specific area provided to color measurement can be arbitrarily set by, for example, the operator, it is possible to easily designate and compare the color of the entire image or the color of the specific area of the image. Therefore, it is possible to prevent a large error in the color measurement result due to the slight shift of the measurement position, unlike the spot area color measurement according to the related art. It is possible to accurately and reliably perform appropriate color matching even for an image with shading or a pattern.

In another embodiment of the present invention, the calculation means may calculate a first color material correction value for making the color of the specific area in the evaluation target data close to the color of the specific area in the reference data for each color of an evaluation medium color material forming the image of the evaluation medium, based on the evaluation result of the reference data and the evaluation target data.

In another embodiment of the present invention, a reference color table may be prepared in which the color measurement result can be associated with a plurality of reference colors with different color densities or halftone dot percent in each portion of the image of the reference data, and the evaluation result may be calculated based on the color information which is calculated using the reference data and the reference color table and the color measurement result of the evaluation medium.

In another embodiment of the present invention, the reference data and the evaluation target data may include an image of a control strip including a solid patch of a color material. The color measurement result may include a color measurement result of the control strip. The calculation means may calculate a second color material correction value for making the color of the control strip in the evaluation target data close to the color of the control strip in the reference data, and give a predetermined weight to the first color material correction value and the second color material correction value to calculate a third color material correction value for correcting an ink supply amount of the evaluation medium color material for each color of the evaluation medium color material.

In another embodiment of the present invention, the color information processing method may further include outputting the image of the evaluation medium whose color is changed when at least one of the first to third color material correction values is reflected in the evaluation target data, to the image display means, by an image simulation means.

According to this structure, color reproduction when the color material correction value is applied can be simulated without actually performing test printing. The simulation result can be checked by, for example, an image display device, or it can be output by the printer and then checked.

In another embodiment of the present invention, the image processing means may display color difference data for each specific area which is based on the evaluation result of the reference data and the evaluation target data on a display screen of the image display means such that at least one of a color, a character, and a numerical value corresponds to the specific area.

In another embodiment of the present invention, the image processing means may perform image matching the reference data input by the input means and image data for a specific color material, using the image data including color information about the specific color material, and separate the color information about the specific color material in the specific area from the color information included in the reference data. The calculation means may calculate a fourth color material correction value for correcting the ink supply amount of the specific color material, based on an ink supply amount and color information table which is made in advance and the separated color information about the specific color material.

In another embodiment of the present invention, at least one of the reference data and the evaluation target data may include an image which is displayed on the display screen of the image display means in an illumination environment of a predetermined evaluation light source and is captured by a wide range of color gamut input means. The image processing means may control a color reproduction area of the display screen of the image display means based on the evaluation result.

In another embodiment of the present invention, at least one of the reference data and the evaluation target data may include an image which is printed by a digital printing means and is input by the input means, and the image processing means may adjust a printing color of the printing means based on the evaluation result.

According to each embodiment of the invention, it is possible to appropriately adjust colors.

In another embodiment of the present invention, the calculation means may generate color quality evaluation data including evaluation information which indicates a comparison and evaluation point of each image and color difference data at the point, based on the evaluation result of the reference data and the evaluation target data.

A color information processing system according to the present invention includes: one or more servers each of which includes an electronic storage that stores the color measurement result and the evaluation result obtained by the above-mentioned color information processing method and stores the reference data, the evaluation target data, and original plate data as electronic data so as to be associated with each other; and a plurality of client terminals that include the image display means, selectively include the evaluation light source and the wide range of color gamut input means, and are connected to the servers through a network. The electronic data used by each of the client terminals is transmitted between the servers and the client terminals. Each of the client terminals controls a color reproduction area of a display screen of the image display means based on the transmitted electronic data and displays at least one of the images of the reference data and the evaluation target data together with the color measurement result and the evaluation result obtained by the evaluation light source and the wide range of color gamut input means. The client terminal transmits at least one of the reference data and the evaluation target data to the server together with the color measurement result and the evaluation result. The server stores the transmitted at least one of the reference data and the evaluation target data, and the color measurement result and the evaluation result as the electronic data in the electronic storage so as to be associated with each other.

A color information processing apparatus according to the present invention includes: an input means for inputting reference data including color information about each pixel or each pixel group of a reference medium and evaluation target data including color information about each pixel or each pixel group of an evaluation medium; an image processing means for performing an image matching process of image matching the input reference data and evaluation target data such that pixel levels thereof correspond to each other; an area setting means for setting a specific area which is a unit of evaluation and includes a plurality of pixels to each data item subjected to the image matching process; and a calculation means for comparing the color information items about each pixel or each pixel group in the reference data and the evaluation target data in the set specific area to calculate a color difference and performing an averaging process to calculate an average evaluation result for the specific area.

In an embodiment of the present invention, the input means may measure the color of a printed matter, a light emitting surface, or an object in a pixel unit or a pixel group unit, and obtain at least one of the color information of the reference data and the color information of the evaluation target data as a color measurement result of a spectral value, an L*a*b* value, an RGB value, a CMYK value, an XYZ value, a density value, a Munsell display value, an infrared wavelength, an ultraviolet wavelength, or an X-ray wavelength.

In another embodiment of the present invention, the calculation means may calculate a first color material correction value for making the color of the specific area in the evaluation target data close to the color of the specific area in the reference data for each color of an evaluation medium color material forming the image of the evaluation medium, based on the evaluation result of the reference data and the evaluation target data.

In another embodiment of the present invention, a reference color table may be prepared in which the color measurement result can be associated with a plurality of reference colors with different color densities or halftone dot percent in each portion of the image of the reference data. The calculation means may calculate the evaluation result based on the color information which is calculated using the reference data and the reference color table and the color measurement result of the evaluation medium.

In another embodiment of the present invention, the reference data and the evaluation target data may include an image of a control strip including a solid patch of a color material. The color measurement result may include a color measurement result of the control strip. The calculation means may calculate a second color material correction value for making the color of the control strip in the evaluation target data close to the color of the control strip in the reference data, and give a predetermined weight to the first color material correction value and the second color material correction value to calculate a third color material correction value for correcting an ink supply amount of the evaluation medium color material for each color of the evaluation medium color material.

In another embodiment of the present invention, the color information processing apparatus may further include an image simulation means for outputting, to the image display means, the image of the evaluation medium whose color is changed when at least one of the first to third color material correction values is reflected in the evaluation target data.

In another embodiment of the present invention, the image processing means may display color difference data for each specific area which is based on the evaluation result of the reference data and the evaluation target data on a display screen of the image display means such that at least one of a color, a character, and a numerical value corresponds to the specific area.

In another embodiment of the present invention, the image processing means may perform image matching the reference data input by the input means and image data for a specific color material, using the image data including color information about the specific color material, and separate the color information about the specific color material in the specific area from the color information included in the reference data. The calculation means may calculate a fourth color material correction value for correcting the ink supply amount of the specific color material, based on an ink supply amount and color information table which is made in advance and the separated color information about the specific color material.

In another embodiment of the present invention, at least one of the reference data and the evaluation target data may include an image which is displayed on the display screen of the image display means in an illumination environment of a predetermined evaluation light source and is captured by a wide range of color gamut input means. The image processing means may control a color region of the display screen of the image display means based on the evaluation result.

In another embodiment of the present invention, at least one of the reference data and the evaluation target data may include an image which is printed by a digital printing means and is input by the input means, and the image processing means may adjust a printing color of the printing means based on the evaluation result.

In another embodiment of the present invention, the calculation means may generate color quality evaluation data including evaluation information which indicates a comparison and evaluation point of each image and color difference data at the point, based on the evaluation result of the reference data and the evaluation target data.

Effects of the Invention

According to the present invention, it is possible to measure the colors of the same portion of the images of a reference medium and an evaluation medium based on image information of the reference medium and the evaluation medium, and compare and evaluate the colors.

In addition, according to the present invention, it is possible to derive information about an output apparatus to be adjusted using a means for adjusting a color difference between a reference medium and an evaluation medium based on the evaluation result and adjust the output apparatus.

Furthermore, according to the present invention, it is possible to measure the colors of media including images formed by a plurality of color materials, compare the colors, and perform color matching to accurately and reliably match the colors when the colors are visually evaluated, without depending on the subjective view of the operator.

EMBODIMENTS FOR CARRYING OUT THE INVENTION

Hereinafter, a color information processing method, a color information processing apparatus, and a color information processing system according to embodiments of the present invention will be described in detail with reference to the accompanying drawings.

In this embodiment, a medium is, for example, a printed matter obtained by forming an image on a sheet with ink using an offset printing method. In this embodiment, color matching is making, for example, the color of a test printed sheet (an evaluation medium in the present invention) which is printed in advance by a printing press which adjusts the amount of ink supplied close to the color of a proof sheet (a reference medium in the present invention), which is a reference print or a reference printed matter, or the color of PPF or TIFF data (one of reference data in the present invention).

The PPF data indicates PPF (Print Production Format) file data and means standard data defined by "CIP4" (International Cooperation for the Integration of Processes in Prepress, Press, and Postpress Organization) which is an international standards group of the CIM in a printing process. The PPF file is related to plate making or printing. The PPF file is related to plate making or printing. The format of the PPF file is a format with an image attached printing process instruction in which the picture of a plate is recorded as a rough image of about 50 dpi and is used to generate ink key information.

Figure 1:
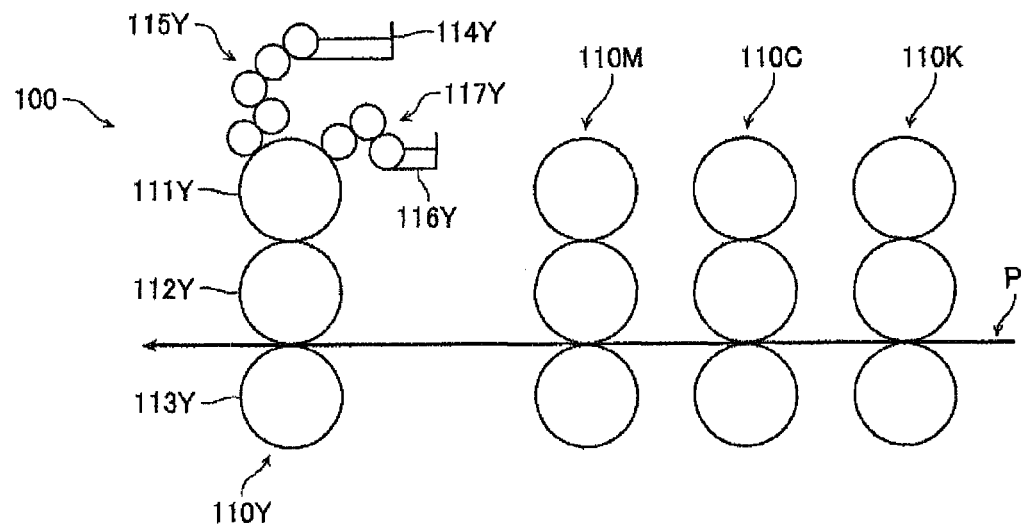
FIG. 1 is a schematic diagram illustrating the structure of a printing press that performs ink supply adjustment to which a color information processing apparatus according to an embodiment of the present invention is applied.

FIG. 1 is a schematic diagram illustrating the structure of the printing press to which a color information processing apparatus according to an embodiment of the present invention is applied and which adjusts the amount of ink supplied (adjusts the color of the medium).

As illustrated in FIG. 1, a printing press 100 includes a black printing unit 110K, a cyan printing unit 110C, a magenta printing unit 110M, and a yellow printing unit 110Y through which a printing sheet P sequentially passes in the direction of an arrow in FIG. 1. The printing units 110K, 110C, 110M, and 110Y of each color have substantially the same structure and the yellow printing unit 110Y will be described as a representative example.

The yellow printing unit 110Y includes, for example, a plate cylinder 111Y, a blanket cylinder 112Y, an impression cylinder 113Y, an ink fountain 114Y, an ink supply roller 115Y, a dampening solution device 116Y, and a dampening solution roller 117Y. The plate cylinder 111Y includes a drum and an aluminum plate formed on the surface of the drum.

The blanket cylinder 112Y is an intermediate cylinder including a drum and a rubber blanket formed on the surface of the drum. The blanket cylinder 112Y transfers ink which is transferred from the plate cylinder 111Y to the printing sheet P. The impression cylinder 113Y is provided so as to be opposite to the blanket cylinder 112Y with the printing sheet P interposed therebetween.

The ink fountain 114Y is a container which stores ink used for printing. The ink supply roller 115Y transfers the ink supplied from the ink fountain 114Y to a printing element of the plate cylinder 111Y. The ink supply roller 115Y is formed by combining a plurality of rollers. A gap between the roller closest to the ink fountain 114Y among the rollers and the ink fountain 114Y is changed to adjust the amount of ink supplied.

The dampening solution device 116Y is a container storing dampening solution which forms a water film on a non-printing element of the plate cylinder 111Y to prevent the attachment of ink. The dampening solution roller 117Y includes a plurality of rollers which supply the dampening solution from the dampening solution device 116Y to the plate cylinder 111Y.

Figure 2:
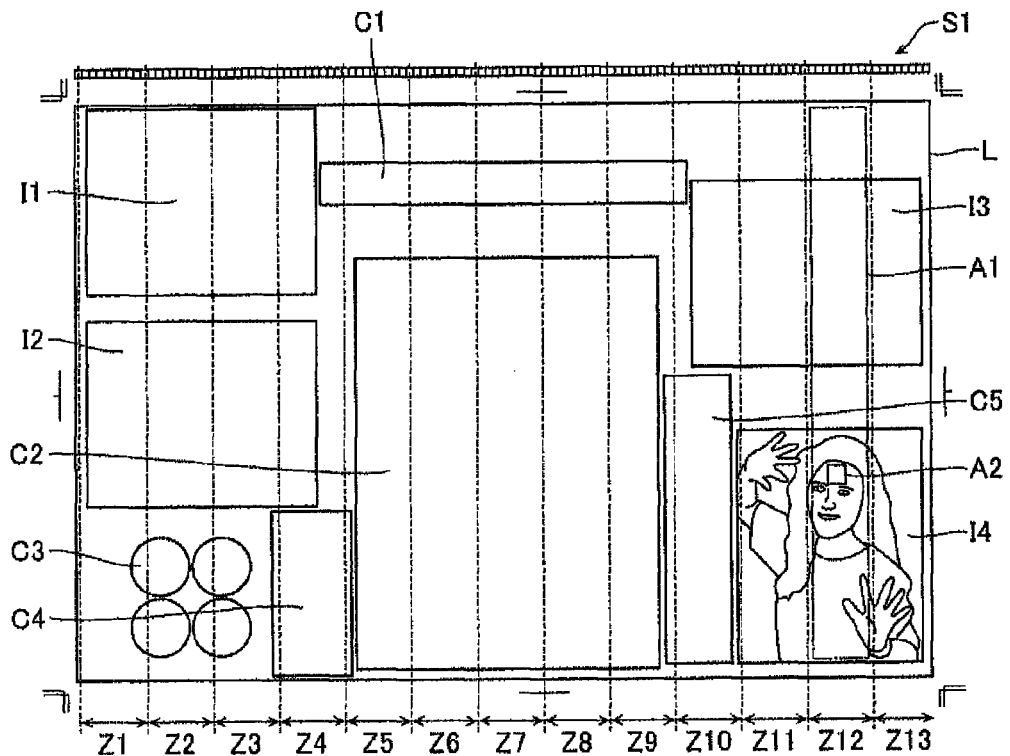
FIG. 2 is a diagram illustrating a printed matter which is an example of a medium to be subjected to color matching.

Next, a printed matter, which is an evaluation medium to be subjected to color matching according to this embodiment, will be described. FIG. 2 is a diagram illustrating an example of the printed test sheet, which is a color matching target medium. In this embodiment, for example, the printed test sheet includes areas (ink fountain areas) Z1 to Z13 in which the amount of ink supplied can be independently adjusted. In the ink fountain areas Z1 to Z13, the amount of ink supplied can be arbitrarily increased or decreased for CMYK and each specific color.

The printed test sheet includes, for example, images I1 to I4 and color charts C1 to C5 which are printed inside a cutting margin L. The images I1 to I4 are, for example, photographs or illustrations, and include an image including a solid patch and a halftone portion or a gradation portion in which a color is continuously changed. In addition, the printed test sheet includes a control strip S1 which is a kind of color chart and is printed outside the cutting margine L.

CMYK solid patches of the ink fountain areas Z1 to Z13 and halftone portions including, for example, halftone dots of 25%, 50%, and 75% are printed in the control strip S1. In this embodiment, color matching (color correction) is performed to make the color of the printed test sheet having the above-mentioned structure close to the color of a proof sheet, which is a reference medium having substantially the same structure as the printed test sheet. Since the control strip S1 includes both the solid patch and the halftone portion of 50% or 25%, it is possible to consider the correlation between the temperature of ink, water, and a dot gain and thus achieve good color reproduction.

Figure 3:
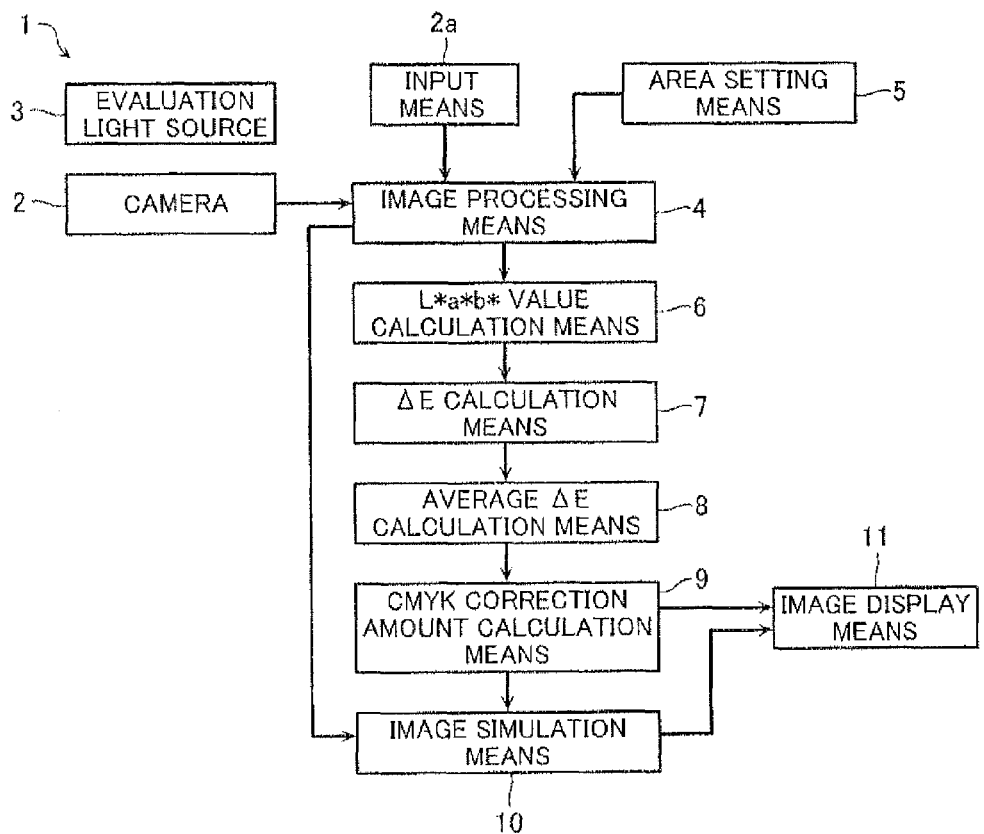
FIG. 3 is a block diagram schematically illustrating the internal structure of the color information processing apparatus according to an embodiment of the present invention.

FIG. 3 is a schematic block diagram illustrating the internal structure of the color information processing apparatus according to the embodiment of the present invention. As illustrated in FIG. 3, a color information processing apparatus 1 includes, for example, a camera 2, an input means 2a, an evaluation light source 3, an image processing means 4, an area setting means 5, a L*a*b* value calculation means 6, a ΔE calculation means 7, an average ΔE calculation means 8, a CMYK correction amount calculation means 9, an image simulation means 10, and an image display means (calibrated wide range of color gamut monitor) 11.

The camera 2 is an input means for sequentially capturing the images of the entire proof sheet and the entire test sheet and inputs reference data including the image of the reference medium and evaluation target data including the image of the evaluation medium and is also a wide range of color gamut image input device that can output images in, for example, an XYZ color system and an L*a*b* color system. In the L*a*b* color system, value is represented by L* and chromaticity indicating hue and chroma is represented by a* and b*.

In addition, a* and b* indicate the directions of a color. For example, +a* indicates the direction of red, −a* indicates the direction of green, +b* indicates the direction of yellow, and −b* indicates the direction of blue. In the L*a*b* color system, as the value of each parameter increases, the definition of the color increases. The wide range of color gamut means a color gamut wider than sRGB (standard_RGB). Specifically, the wide range of color gamut means the color gamut of the eye or a color gamut in a color space, such as Adobe RGB (registered trademark) or NTSC (National Television System Committee).

The camera 2 has a color visual region which is defined in xyz by CIE (Commission Internationale del l'Eclairage). In addition, when the surface of ink is macroscopically viewed, the shape thereof is different in the wet state of the printed matter immediately after printing and in the dry state after ink is dried. Therefore, in some cases, the printed matter is viewed in different colors in the wet state and the dry state. A PL (polarizing) filter can be attached to the camera 2 in order to prevent the influence of the color difference.

This process may be performed by image processing having substantially the same effect as that obtained by the PL filter. In addition, an RGB or CIEXYZ equivalent or spectroscopic color sensor element or a line-sensor-type scanner using a filter or a light source may be used instead of the camera 2. The color sensor element may sense a visible region, an infrared region, an ultraviolet region, a radio wave region, and an X-ray wavelength region. The input means 2a may be an image input equipment, such as the scanner, or an input interface which can receive data transmitted through a network, for example.

In this embodiment, a dot of the image is a minimum unit forming the image and simple physical point information. In addition, a pixel of the image is a minimum unit forming the image and is generally used as a synonym for the dot. However, in this embodiment, the pixel means a minimum unit or a minimum component with color information (a color tone or a grayscale level) when a computer treats the image. Therefore, in a case of monochrome, one dot is one pixel. In a case of a color, RGB forms one pixel and CMYK forms one pixel. Alternatively, XYZ forms one pixel and L*a*b* forms one pixel.

A pixel group of the image is set to a minimum range which can be recognized by the human eye. The pixel group varies depending on the size of the pixel. In a case of the printed matter, the pixel group means a range of about 1 mm×1 mm to 3 mm×3 mm. However, the size or shape of the pixel group is not particularly limited. As the shape of the pixel group, for example, when the image is formed in a fine picture, a pixel group in a circular range is read. Even in various picture shapes, when the pixel group has the circular range, it is easy to arrange color measurement points and the influence of colors around the shape range of the pixel group is reduced.

On the other hand, when the pixel group has a star shape, colors around the shape range of the pixel group are also read and it is possible to perform color measurement considering the peripheral colors. In this case, the reading of the colors depends on the length and area of a triangular portion having each vertex. In addition, the reference medium and the evaluation medium includes objects, such as products having images, for example, pictures, photographs, characters, and pictures drawn on planar materials and cubic materials, in addition to the proof sheet and the printed test sheet. The planar materials are made of various materials, color materials, colored light, and phosphors. The cubic materials are made of various materials, and include, for example, sheets with a slightly uneven surface, cloth, metal, a resin, a colored surface of liquid, a light emitting material including a color display of liquid crystal or laser, a vase, and a pot.

The unit of color measurement by the camera 2 is a pixel or a pixel group including a plurality of pixels. In this embodiment, color information obtained by color measurement is L*a*b* values. However, the color information may be, for example, a spectral waveform (spectral value), a spectral image, RGB values, CMYK values, XYZ values, a density value, a Munsell display value, reflectance and transmittance, an infrared wavelength, an ultraviolet wavelength, or an X-ray wavelength.

The evaluation light source 3 illuminates the proof sheet and the printed test sheet, for example, when the camera 2 captures an image. For example, a fluorescent tube having a high color rendering property with a color temperature of D50 (5000 K) or D65 may be used as the evaluation light source 3. In addition, when it is determined that the printed matter is displayed in a given illumination environment, a light source for reproducing the illumination environment may be used as the evaluation light source 3.

As an irradiation method using the evaluation light source 3, the following methods are used as a standard: a method in which light is incident on an object to be measured, such as a printed matter, at an angle of 45° and the evaluation light source 3 does not directly affect the image input equipment, such as the camera 2; and an integrating sphere irradiation method. In addition, in the measurement of a transparent medium, the irradiation method includes a method suitable for the measurement of a transmissive image in a total dark environment or a transmissive image including external light in a practical environment in which the transparent medium is affected by external light. Therefore, the evaluation light source 3 radiates diffusion light at an illumination angle suitable for the reflection and transmission of light according to the surface shape of an object to be measured or the structural shape of the medium.

In general, it is preferable that totally-diffused light which is called domical diffusion light be used for a material with a smooth surface when light is diffusely reflected from the surface of the image input equipment, such as the camera 2, at an angle of 45° and color measurement be performed by the same standard. For example, a spectrum, RGB, X-rays, infrared rays, ultraviolet rays, α-rays, and γ-rays may be used as the evaluation light source 3 or a wavelength. The evaluation light source 3 may be a backlight for a display screen provided in the image display means 11 or other light-emitting bodies.

Figure 4:
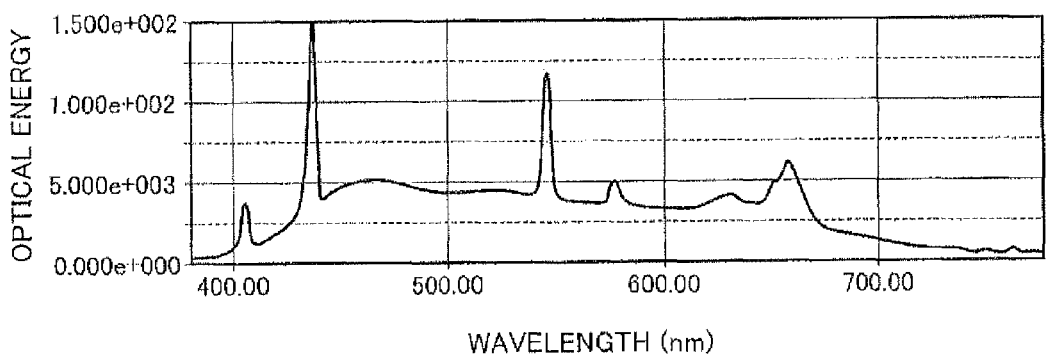
FIG. 4 is a graph illustrating an example of the spectral distribution characteristics of a fluorescent tube with a color temperature of 5000 K which is used as an evaluation light source in an embodiment.

FIG. 4 is a graph illustrating an example of the measured value of the spectral distribution characteristics of the fluorescent tube. The spectrophotometer according to the related art calculates a colorimetric value at the color temperature, 5000 K, of illumination light (the global standard D50 of a light source for evaluating the color of the printed matter) in order to maintain the colorimetric value to be constant. Therefore, a difference in the value measured by the color measurement device is minimized and the measured value is a standard for color comparison.

However, when the spectrophotometer is actually used to compare the printed matter with a final contract proof obtained by a color proofer (a proof sheet which is proofed with a customer's approval), in some cases, there is a large difference between the color of the printed matter and the actual color. The spectrophotometer calculates the colorimetric value at the color temperature, 5000 K of illumination light in order to maintain the colorimetric value to be constant. However, in the actual color evaluation for the printed matter, even in any fluorescent lamp which emits illumination light with a high color rendering property (the color rendering property means the uniformity of illumination light without light of a wavelength which is deficient in the amount of light in the visible range of 400 nm to 700 nm), as illustrated in FIG. 4, there is a peak in a specific wavelength and it is difficult to obtain the same effect due to a difference in illumination.

Therefore, even in the illumination light which has a high color rendering property and is viewed as white light, the measured value of color information (L*a*b*) greatly varies depending on the spectrophotometer. Until now, it is considered that the value measured by the spectrophotometer is equal to the visual result. However, in practice, the test using an input system including an XYZ filter capable of measuring L*a*b* values proved that they were different from each other due to the difference in illumination.

A general standard light source for printing is used as the illumination light source based on the above-mentioned result, as in this embodiment. In this case, it is possible to obtain a color measurement device matched with visual color sensitivity. In addition, when it is known that the printed matter can be viewed in a specific illumination environment, a light source capable of reproducing the illumination environment can be used as the evaluation light source 3 to perform accurate color matching.

The image processing means 4 processes the image data which is input from the camera 2 or the input means 2a. Specifically, the image processing means 4 performs an image matching process of, for example, positioning the images of the reference medium and the evaluation medium on a common coordinate axis of the images and removing a relative size difference and relative distortion, such that the pixel levels of the images correspond to each other, based on image data of the reference data and the evaluation target data including the input images of the reference medium and the evaluation medium.

As such, the process of measuring the colors of the surfaces of the reference medium and the evaluation medium, image matching the obtained reference data and the evaluation target data, comparing the corresponding pixels or pixel groups, and calculating an average color difference in the predetermined range is referred to as "image area color measurement" in this embodiment.

The reference data may include the image of a control strip including a color material solid patch and reference medium color material information related to the density or halftone dot percent (halftone dot %) of the color of each color material in the image and the color material solid patch, in addition to the image of the reference medium. In addition, the evaluation target data may include the image of the control strip.

The area setting means 5 arbitrarily sets, for example, a specific area, which is a color measurement target or a measurement target, an area of interest including a plurality of specific areas to some or all of the image data items captured by the camera 2. The specific area indicates, for example, an area including a plurality of pixel groups each having a plurality of pixels and the area of interest indicates an area including a plurality of specific areas. For example, the area of interest is set to a portion of the printed matter which requires particularly accurate color reproduction and the operator can use a touch panel or a pointing device, such as a mouse, to arbitrarily set the shape or size of the area of interest. In addition, a plurality of areas of interest may be set.

In this embodiment, an example in which the entire image I4 illustrated in FIG. 2 is set as the area of interest will be described. The image processing means 4 extracts data related to the area of interest I4 which is set by the area setting means 5 from digital images of the proof sheet and the printed test sheet, divides the area of interest I4, and uses each or some of the areas arranged in a matrix as the specific areas. The minimum unit of color comparison and evaluation is not one pixel, but is one pixel group including, for example, about 16 to 400 pixels (4×4 pixels to 20×20 pixels).

Figure 5:
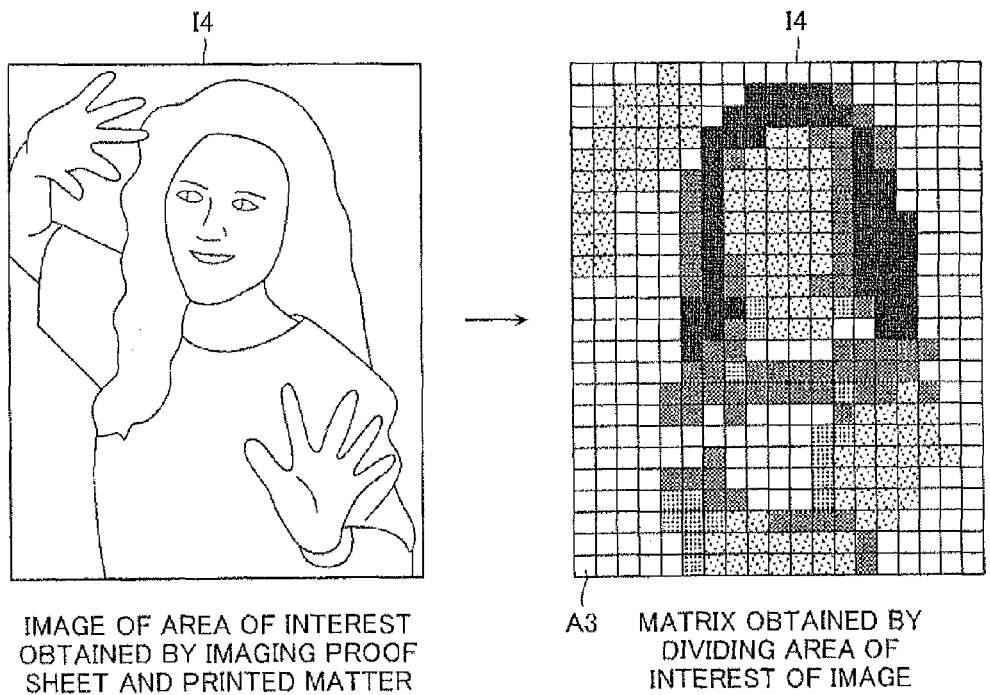
FIG. 5 is a schematic diagram illustrating an example in which an area of interest of an image is divided into a matrix and color reproduction is checked in an embodiment.

FIG. 5 is a schematic diagram illustrating the unit of processing. As such, the area of interest I4 is divided into matrix frames A3. All or some of the divided matrix frames A3 are used as the specific areas A2 to set the evaluation range of image area color measurement. In this way, a process of dividing the area of interest I4 into small areas and specifying the specific area A2 to be evaluated is simplified. The specific area A2 includes one pixel group or a plurality of pixel groups. In addition, since color evaluation is performed for each pixel group, it is possible to prevent the influence of the shift of the comparison point of the measurement point or a variation in the measured value due to a grayscale level or a shape.

The size of the unit of color measurement may be variable. In this case, for example, when a color patch is measured, the area of the unit of color measurement is reduced and it is possible to reduce the influence of the reading of peripheral colors due to a little shift of the measurement point. In addition, when the division ratio of the area of interest I4, the size of each pixel group, and an evaluation area are equally set in the images of the reference medium and the evaluation medium, evaluation equivalent to sensory evaluation for sensing a difference in the printed image between persons is performed. Therefore, the size of the pixel group may be set to the minimum value which enables the human eye to recognize a color different.

The matrix frame A3 is a divided frame with a predetermined shape, such as a rectangular shape or a circular shape, in order to determine a color difference between arbitrary areas of an image including a picture or a solid area, a flat tint image, an image including graphic charts and characters, or a picture image. For example, in an offset printed matter, the matrix frame A3 is provided in a printing ink fountain unit or a photograph unit. Alternatively, for example, the matrix frame A3 with a size of about 3 mm is set. In this case, it is possible to display a color difference in the range of each divided matrix frame A3, or it is possible to display a list of the color differences such that the user can recognize the color difference as a numerical value. In this way, it is possible to perform color adjustment to make the image of the evaluation medium close to the image of the reference medium.

The L*a*b* value calculation means 6 averages an L*a*b* value, which is color information measured for each pixel or each pixel group in the range of the matrix frame A3 in the area of interest I4, for a pixel group larger than the unit of color measurement, thereby calculating pixel group average color information (/L*a*b* value). As such, in this embodiment, since the color information is averaged in the pixel group larger than the unit of color measurement, the influence of noise is removed.

The ΔE calculation means 7 compares the pixel group average color information /L*a*b* values for each pixel group in the specific areas in each of the images of the proof sheet and the printed test sheet which are image-matched on each other to calculate the color difference (pixel group color difference) ΔE of each pixel group.

The average L*a*b* value of the pixel group is obtained by calculating the total sum of the L*, a*, b* values of n pixels forming the pixel group and dividing the total sum by n and is a base for calculating the pixel group color difference.

Specifically, a general pixel color difference ΔE is obtained by image matching the image of the reference medium and the image of the evaluation medium and subtracting an evaluation L*a*b* value from a reference L*a*b* value for each pixel of the same picture portion (for example, the same specific area or the same matrix frame A3) and is represented by the following Equation (1).

[Equation 1]

$$\Delta E = \sqrt{(L1-L2)^2 + (a1-a2)^2 + (b1-b2)^2} \qquad (1)$$

In the meantime, the pixel group color difference ΔE in image area color measurement is obtained by image matching the image (reference image) of the reference medium and the image (evaluation image) of the evaluation medium, calculates the total sum of the L*a*b* values of all pixels in the pixel group in which the reference data and the evaluation data correspond to each other in the same picture portion, averaging the total sum to calculate a reference L*a*b* value, and subtracting an evaluation L*a*b* value which is calculated by the same method as described above from the reference L*a*b* value, and is represented by the following Equation (2).

[Equation 2]

$$\text{Pixel group color difference } \Delta E = \sqrt{\{(L1m1+L1m2+,\ldots,L1mn)/n\} - \{(L2m1+L2m2+,\ldots,L2mn)/n\}^2 + \{(a1m1+a1m2+,\ldots,a1n)/n\} - \{(a2m1+a2m2+,\ldots,a2mn)/n\}^2 + \{(b1m1+b1m2+,\ldots,b1n)/n\} - \{(b2m1+b2m2+,\ldots,b2mn)/n\}^2} \qquad (2)$$

The average ΔE calculation means 8 averages the pixel group color difference ΔE calculated by the ΔE calculation means 7 over the specific areas or the entire area of interest I4 corresponding to the ink fountain (the ink fountain areas Z1 to Z13), which is an adjustment target, to calculate color difference data for the pixel group color difference average value. The color difference data is variously uses as the comparison and evaluation result of each image. Instead of the average value of the pixel group color difference ΔE, the average value of color difference for each pixel may be calculated.

In addition, the average ΔE calculation means 8 calculates a pixel color difference average or a pixel group color difference average, which is a comparison value between the color difference average values of all of the pixels or the pixel groups in each specific area or each matrix frame A3, based on the pixel color difference ΔE or the pixel group color difference ΔE, and calculates color difference data for the entire area of interest I4.

On the other hand, for example, a general pixel color difference average value is obtained by totalizing n pixel color differences ΔE in the range of the matrix frame A3 including a total of n pixels and dividing the total sum by n, which is a total number of pixels, and is represented by the following Equation (3).

[Equation 3]

$$\Delta E = (\text{pixel } \Delta E1 + \text{pixel } \Delta E2+, \ldots, \text{pixel } \Delta En)/n \qquad (3)$$

Specifically, the pixel group color difference average value in the image area color measurement is obtained by totalizing n pixel group color differences ΔE in the range of the matrix frame A3 including a total of n pixel groups and dividing the total sum by n, which is a total number of pixel groups, and is represented by the following Equation (4).

[Equation 4]

$$\Delta E = (\text{pixel group } \Delta E1 + \text{pixel group } \Delta E2+, \ldots, \text{pixel group } \Delta En)/n \qquad (4)$$

Figure 6:
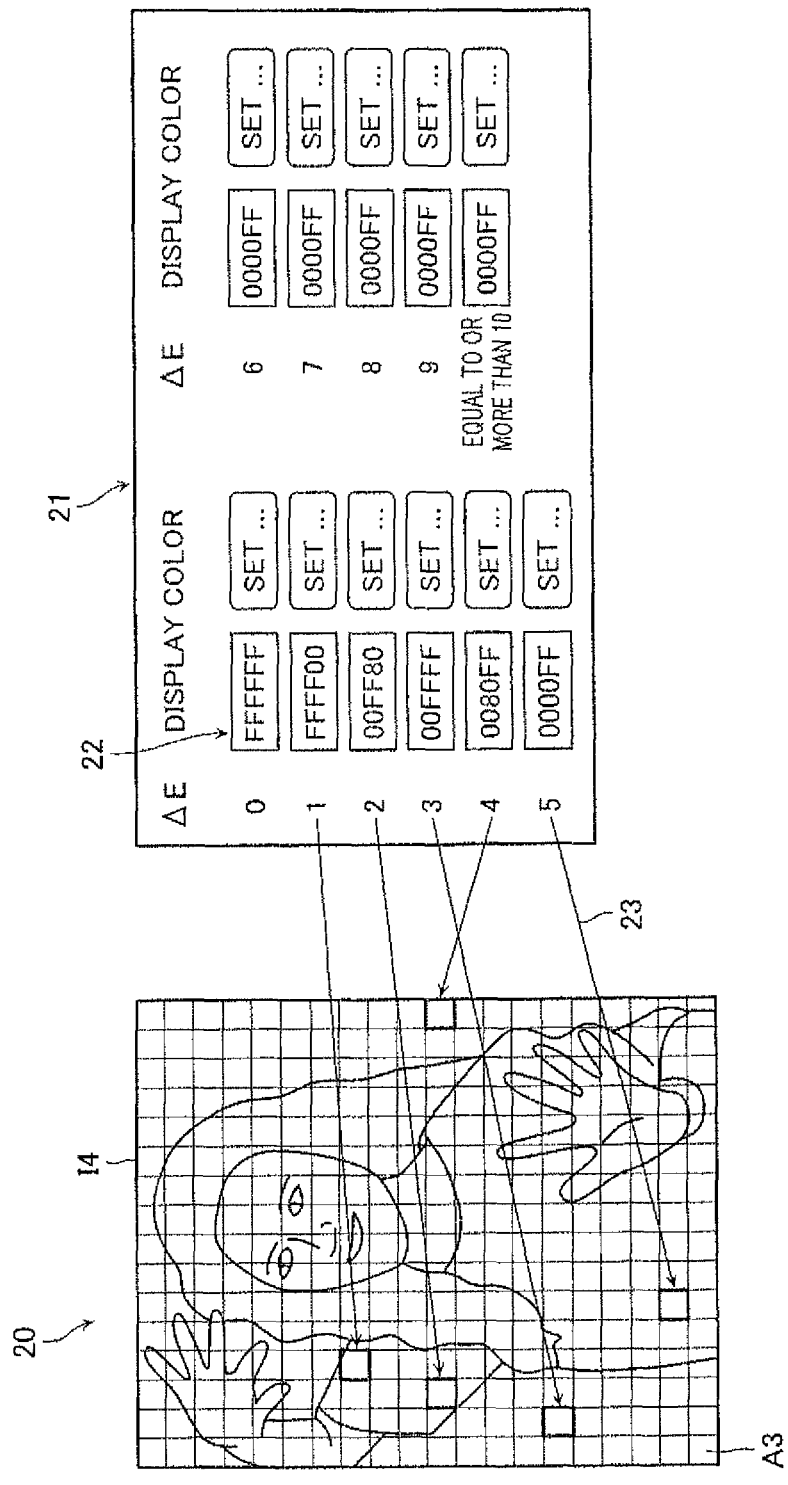
FIG. 6 is a diagram illustrating an aspect of the display of the evaluation result on a display screen of an image display means according to an embodiment.

The color difference data for the specific area or the area of interest I4 may be displayed as the comparison and evaluation result on a display screen (monitor screen) (not illustrated) of the image display means 11 by at least one of colors, characters, and numerical values, as illustrated in FIG. 6. In FIG. 6, for example, an image display field 20 in which the colors of the images in the area of interest I4 are classified together with the matrix frames A and the images are displayed so as to be image-matched and a data display field 21 in which the color difference value or color information of each matrix frame A3 displayed in the image display field 20 is displayed by colors, characters, and numerical values are displayed on the display screen.

Each matrix frame A3 of the image display field 20 is displayed such that the colors of the edges of each frame are classified depending on the difference in the color difference value. In addition, a color information value display frame 22 in the data display field 21 is displayed such that the color thereof is classified so as to correspond to the color classification. In order to easily check the color difference ΔE, the matrix frame A3 in the image display field 20 and the color difference value in the data display field 21 which correspond to each other may be displayed so as to be connected to each other by, for example, an arrow 23.

When the comparison and evaluation result of the color measurement result obtained by the image area color measurement may be displayed on the display screen of the image display means 11, it is possible to instantly determine the content of the comparison and evaluation result with the eye. In addition, when the color measurement result obtained by the image area color measurement is used, the colorimetric value or the color difference value may be displayed in, for example, a balloon shape (not illustrated) on the display screen to display the evaluation result.

In addition, the evaluation result may be displayed by, for example, the color classification of numerical values or symbols so as to be image-matched on the images while the captured image of the proof sheet and the captured image of the printed test sheet are display in parallel or alternately. Furthermore, as illustrated in the data display field 21 of FIG. 6, a list of the measured color difference values or color information may be associated with each matrix frame A3 based on the evaluation result. In this case, when a mouse is used to click and select an arbitrary matrix frame A3, the numerical value or color in the color information numbers display frame 22 can be changed in operatively association with the selection of the arbitrary matrix frame A3.

As such, a list of the magnitude relation between the colorimetric values or the color difference values can be displayed and the colors thereof can be classified into, for example, blue, green, yellow, orange, and red. In this case, it is possible to easily check the color difference and it is possible to easily and rapidly determine whether the analysis result of the image is good based on the evaluation result based on the color measurement result obtained by the image area color measurement. In addition, the colorimetric value or the color difference value can be displayed by the color difference average (or the average of the measured values of each pixel) of each pixel of the reference image and the evaluation image, the average color difference (or the comparison between the average values of all pixels), or a combination of the color difference average and the average color difference.

The CMYK correction amount calculation means 9 calculates an ink supply amount correction value of each of C, M, Y, and K, which are evaluation medium color materials, based on the value calculated by the average ΔE calculation means 8 such that, for example, the color of the printed test sheet is close to the color of the proof sheet. A method of calculating the ink supply amount correction value will be described in detail below.

In addition, the CMYK correction amount calculation means 9 calculates a first ink supply amount correction value for making the color of the specific area or the area of interest I4 in the evaluation image close to the color of the specific area or the area of interest I4 in the reference image for each color of the evaluation medium color material, based on the value calculated by the average ΔE calculation means 8. At the same time, the average ΔE calculation means 8 calculates a second ink supply amount correction value for making the color of the control strip of the evaluation medium close to the color of the control strip of the reference medium for each color of the evaluation medium color material, based on the spot area color measurement result or the image area color measurement result of the control strip S1, similarly to the related art.

The average ΔE calculation means 8 may perform a weighting process of giving an arbitrarily set weighting coefficient to the calculated first and second ink supply amount correction values to calculate a final ink supply amount correction value for correcting the ink supply amount of the evaluation medium color material for each color of the evaluation medium color material.

As such, a weighting process is performed on the first ink supply amount correction value based on the image area color measurement of the specific area and the second ink supply amount correction value based on the point or image area color measurement of the control strip to calculate a third ink supply amount correction value. In this way, it is possible to perform accurate color reproduction. In addition, the color of the control strip is measured by the image area color measurement or the spot area color measurement to perform color proof. In this way, it is possible to perform color measurement with high accuracy. For example, a spectrophotometer or a densitometer which measures a spot area color may be used as the spot area color measurement means.

In this case, when correction is performed with the first and second ink supply amount correction values being equal to or greater than a predetermined threshold value, for example, there is a concern that a ghost phenomenon in which a color is diluted will occur. Therefore, the CMYK correction amount calculation means 9 functions as an alarm means and can display alarm information, such as characters or images indicating the occurrence of the ghost phenomenon, on the display screen of the image display means 11. According to this structure, when the first and second ink supply amount correction values are beyond a predetermined range, correction is performed with an emphasis on any one of the ink supply amount correction values. As a result, it is possible to prevent, for example, an increase in color difference from the area which is not corrected.

In the printing process of the printing press 100, even when the color of ink is sufficiently managed, a large amount of ink is used in a solid patch (halftone dot 100%) of the printed matter or a flat color close to the solid patch. Therefore, a small amount of ink is supplied to the picture to be printed on a portion which is arranged immediately after the solid patch in the printing direction (on the circumference of the printing cylinder). As a result, in some cases, irregular printing which is called the ghost phenomenon occurs. In addition, a defect, such as printing surface color unevenness in which color density is changed in the printing direction, occurs. In the color management using the control strip, it is difficult to check the unevenness and perform color matching.

As described above, the color of the picture surface of the image is directly measured by the image area color measurement. For example, the minute difference in color reproduction between the pictures of the reference image and the evaluation image is detected with high accuracy. The evaluation result of, for example, the color difference which is close to the sense of the human eye is digitized, and the ink supply amount correction value is calculated. In this way, the following color management can be performed.

That is, the correction direction of colors is displayed by a vector such that the color to be corrected is easily determined in a CIELAB color space. In this way, it is possible to navigate the ink correction value of each color. The color measurement result or the evaluation result obtained by the image area color measurement according to this embodiment can be not only used for color correction by the control of each ink key of the ink fountain of the printing press 100, but also used for color evaluation which evaluates the color of the picture using, for example, the L*a*b* value or the color difference ΔE (or CIEDE2000*).

Therefore, even in a portion in which the ghost phenomenon occurs, the colors of important portions of the reference image (in a case of CMYK data for an L*a*b* image obtained by inputting a final contract proof into a wide range of color gamut image input device, a PPF image, or a TIFF image after RIP, image data which is converted into the L*a*b* value by an ICC profile) and the test image (L*a*b* image data obtained by inputting, for example, a printed matter or a print to the wide range of color gamut image input device) are measured by an image area color measurement method after the pictures overlap each other, and the calculated color difference is analyzed. In this way, it is possible to frequently determine whether the deviation of the color reproduction of the printed matter is within an allowable range. Therefore, the color measurement result or the evaluation result obtained by the image area color measurement can be used for, for example, color evaluation, color management, and output control using color reproduction values of various printers including the printing press according to the related art.

In a case in which the color (density) of the picture of a specific portion is considerably changed due to the ghost phenomenon in the printing surface or the surface unevenness of the printing press, when the ink key is used to control colors in order to perform color matching on the picture of the portion, other pictures in the range of the ink key are affected. As a result, in some cases, it is difficult to perform color adjustment.

It is considered that the color of the CMYK image data is partially corrected, returning to a design process or a prepress process. However, in this case, since the color unevenness of the printing surface cannot be measured, it is difficult to feed the color measurement result or the evaluation result back to the prepress process. According to the color information processing method of the present invention, data for a portion in which surface unevenness occurs due to, for example, the ghost phenomenon or the uneven printing pressure of the printing press is obtained by the image area color measurement. Therefore, for example, when data in the prepress process or the design process is corrected by CMYK %, it is possible to perform accurately color modification (correction) on the ghost phenomenon or the surface unevenness.

The ink supply amount of each ink fountain in the printing press 100 is adjusted based on the ink supply amount correction value calculated by the CMYK correction amount calculation means 9 to make the color of the printed test sheet close to the color of the proof sheet. However, in this case, a sheet or ink for test printing is consumed in order to check the correction result whenever test printing is performed.

In this embodiment, the color information processing apparatus 1 has an image simulation function which can simulate the printing result obtained when the ink supply amount correction value is applied on the display screen of the image display means 11. The image simulation means 10 performs image simulation using a CIP4_PPF file which is a CMYK image.

Figure 7:
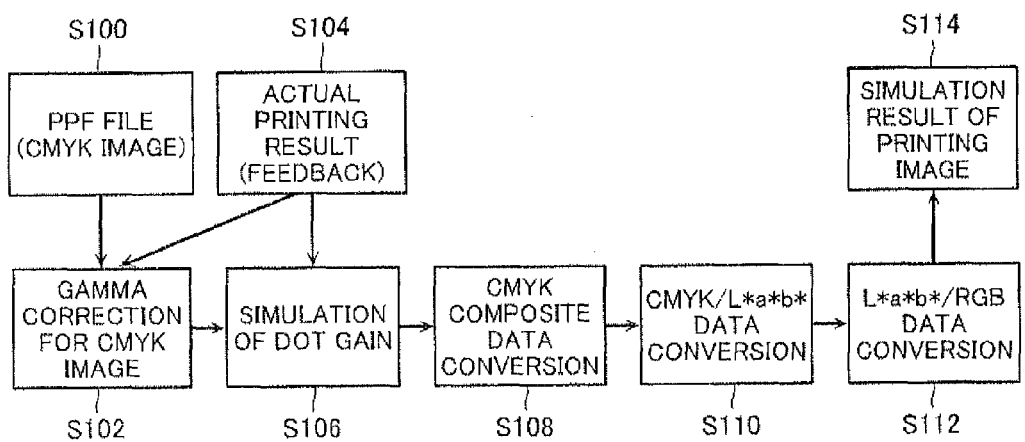
FIG. 7 is a diagram illustrating the outline of a method of simulating the color reproduction of a printed matter from PPF data in an embodiment.

FIG. 7 is a diagram illustrating the outline of a method of simulating the color reproduction of a printed matter from CIP4_PPF data. In the prepress process, when print data is created by RIP, similarly, the CIP4_PPF file is created (Step S100). The CIP4_PPF file is used as data for presetting the amount of ink supplied from the ink fountain of the printing press 100 according to the image.

Therefore, the CIP4_PPF file includes image data which has a low resolution of about 50 dpi and is divided to the same CMYK as print data. The CIP4_PPF file is an example of reference data including information related to the halftone dot % (halftone dot percent) of each of C, M, Y, and K in each portion of the image and the control strip.

In this embodiment, the CMYK image data is divided in the unit of the ink fountains of the printing press 100 and the finished image is simulated based on the colorimetric value (L*a*b* value) of the control strip S1 of the color-measured printed matter and is then displayed on the display screen of the image display means 11. In addition, the color reproduction of the image when the amount of ink supplied from the ink fountain is additionally corrected is simulated and displayed. Here, RIP is an abbreviation of a raster image processor, is an engine which converts data of a proofread page into halftone dot data for printing, and is used when a printing plate is output by a plate recorder.

Next, the order of processes will be described.
<Color Reproduction in Unit of Ink Fountains by Gamma Correction>

The color of each CMYK solid patch of the control strip S1 of the printed test sheet is measured (L*a*b*) and gamma correction is performed for the image corresponding to each ink fountain based on the measurement result (Step S102). In this way, it is possible to simulate an influence on the color reproduction of the entire printed matter. In particular, when the colorimetric value of the control strip S1 is within a reference value, but the color of the specific area or the area of interest in the image is not matched, it is possible to check an influence on the color of a peripheral image in a pseudo manner using color correction.

It is checked whether the degree of deviation from the reference value (target value) of the control strip S1 is within the limited range based on numerical values (solid and halftone) in an alarm report and it is possible to prevent excessive correction with visual observation. The relation between the amount of ink and gamma is calculated based on the actual printing data. In this case, a color measurement device measures each color of the control strip S1 in the printed matter with the L*a*b* value. When there is a color difference, the measurement result is fed back to a "CMYK gamma correction module" which calculates a gamma correction amount and a gamma correction filter is corrected. In the calculation of the correction amount, a predicted value of the gamma correction value and the colorimetric value of the printed matter are fed back each time the correction amount is calculated (Step S104). In this way, it is possible to statistically derive the gamma correction value most suitable for each ink using a learning function.

<Simulation of Dot Gain>

The dot gain of the printing press 100 varies depending on ink or sheet, and the characteristics of the printing press 100 and color reproduction also varies. When CMYK data is converted into RGB data, a change in the dot gain (a dot is grown to be larger than the halftone dot of the printing plate) which occurs during printing is added to the CMYK data in advance. In this way, it is possible to simulate printing reproduction (Step S106) with high accuracy.

Figure 8:
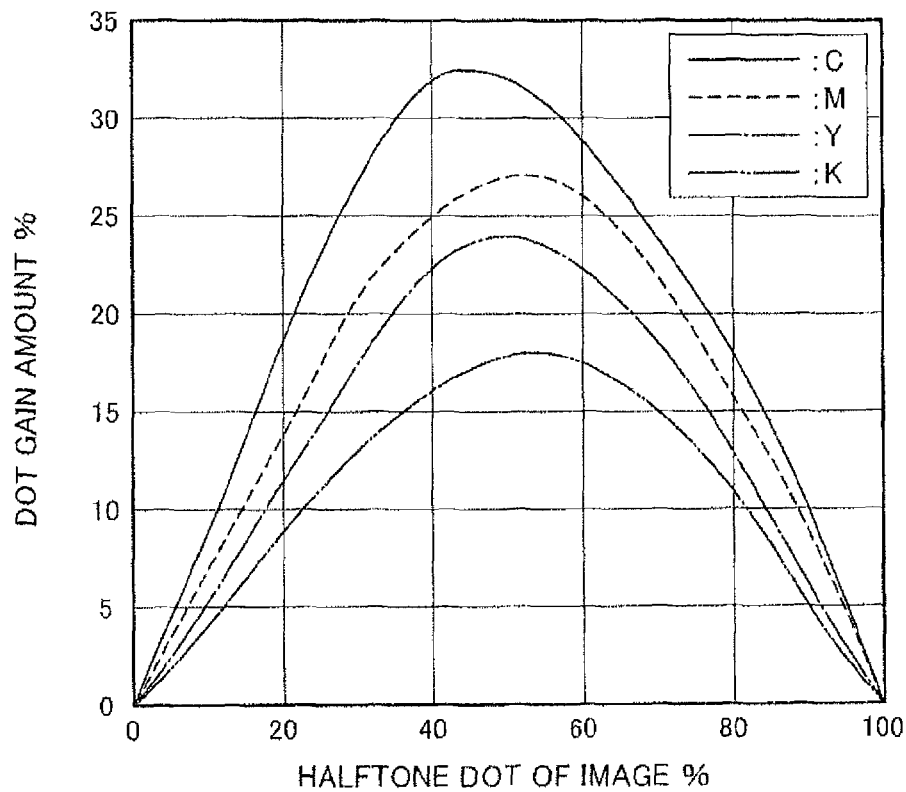
FIG. 8 is a graph illustrating an example of a dot gain in printing.

A standard dot gain is measured by printing a dot gain measurement chart (halftone dot 0% to 100%) under predetermined printing conditions (for example, a sheet, the kind of ink, the reference density of each of C, M, Y, and K, a printing press, temperature, and humidity) and the result illustrated in FIG. 8 is obtained.

FIG. 8 is a graph illustrating an example of the dot gain in printing. In addition, a change in the dot gain due to a change in ink density is simulated by the following computation expression and can be simply used. Furthermore, the term "Factor" is a value which is fed back from the actual result by the learning function.

"Standard dot gain value"×(1+measured value÷reference value×Factor)=dot gain

Figure 9:
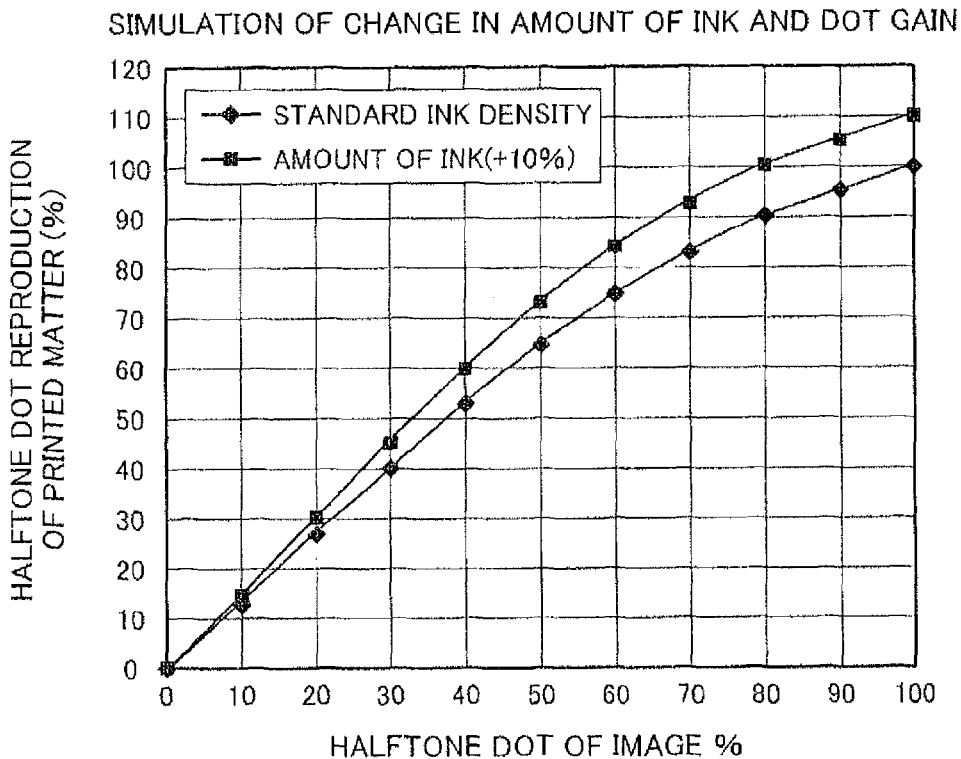
FIG. 9 is a graph illustrating an example of a dot gain simulation result with respect to a change in the amount of cyan ink in an embodiment.

FIG. 9 is a graph illustrating an example of the dot gain simulation result of cyan with respect to a change in the amount of ink. FIG. 9 illustrates the result obtained by adding a change in the dot gain when the amount of ink is increased by 10% and a change in gamma characteristics, converting the color reproduction of a printed matter into a dot gain, and simulating the dot gain. The actual halftone dot does not exceed 100% and a change in color is represented by a graph.

However, the maximum density value (255-th step in the case of 256 grayscale levels of 0 to 255) is set such that density corresponding to 120% of reference density (the thickness of a maximum ink film which can be practically printed) can be reproduced, considering the color (density) control range of the printing press 100. In this way, it is possible to simulate the color which is printed with density higher than the reference density.

Since color reproduction is different from the actual color reproduction, finally, it is possible to represent the color of ink with the L*a*b* value using the ICC profile. However, when a color is printed at ink density different from that when the ICC profile is created, the color does not correspond to colors in a table and it is difficult to reproduce a correct color. Therefore, similarly to the simulation of contrast, the simulation of the dot gain is also effective in predicting colors.

When the printing result is different from the predicted dot gain, the difference is fed back, which makes it possible to accurately predict the dot gain when the next printing process is performed. In addition, even in reproduction in which density is more than the reference density, the maximum density value is limited to 100% and an option which puts emphasis on the color reproduction of an image is prepared such that the gradation of the color with a density less than 100% can be reproduced.

Figure 10:
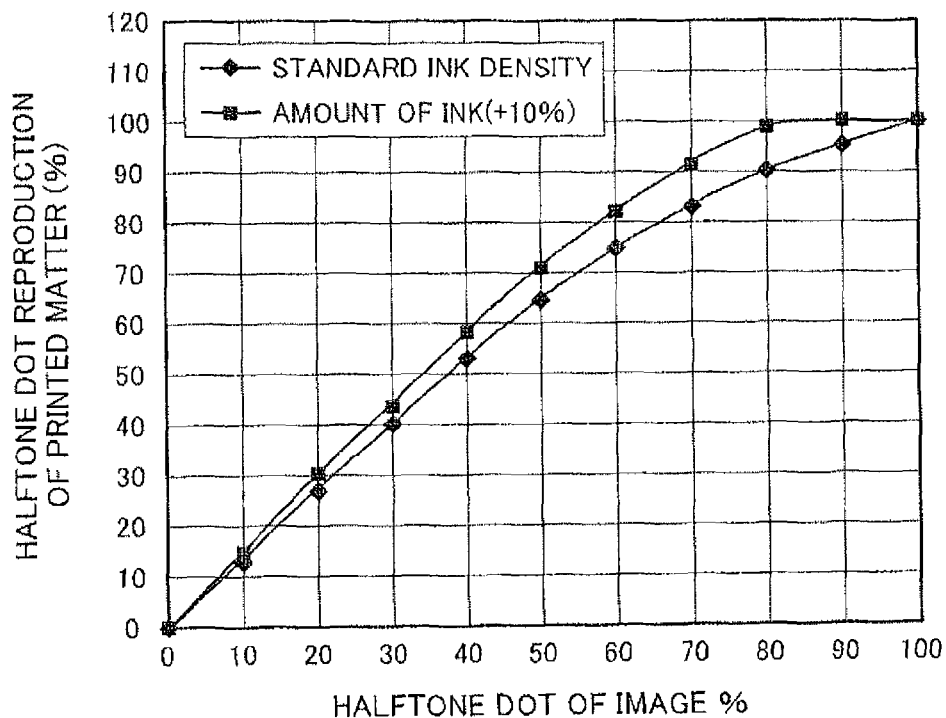
FIG. 10 is a graph illustrating a limitation in display equal to or more than 100% in which emphasis is put on the color reproduction of an image.
Figure 11:
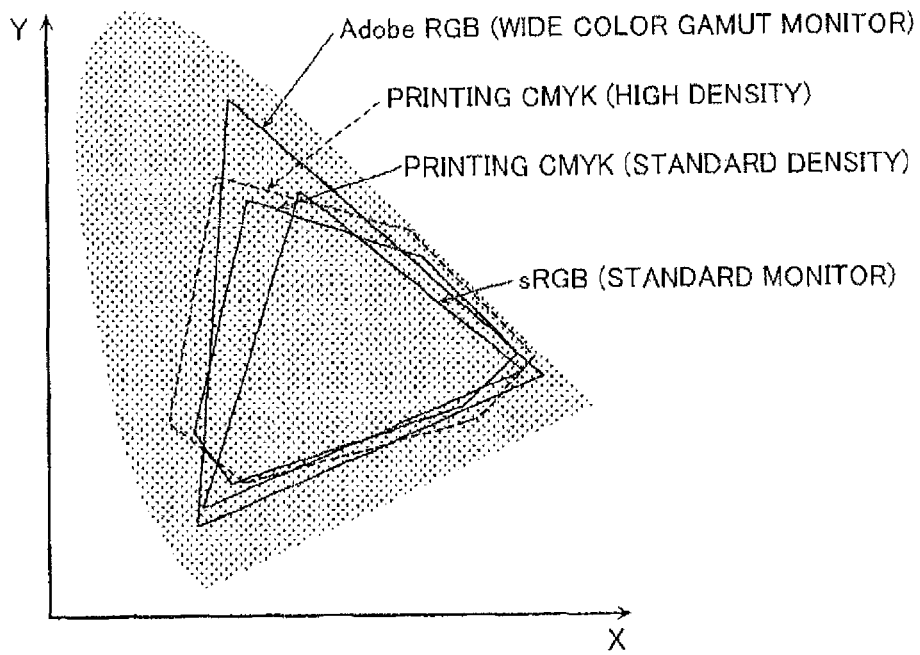
FIG. 11 is a diagram illustrating the comparison between the color spaces of various kinds of media and gamut mapping.

FIG. 10 is a graph illustrating a limitation in display equal to or more than 100% in which emphasis is put on the color reproduction of an image. FIG. 11 is a diagram illustrating the comparison between the color spaces of various kinds of media and gamut mapping. Gamma and dot gain elements are added according to the color of the image to be checked to make the color reproduction of a printed matter close to the actual color reproduction.

However, when the ink density of the printed matter increases, there is a color which cannot be reproduced by a color monitor and a gamut mapping process of compressing a color space of a dotted line which cannot be reproduced by a monitor illustrated in FIG. 11 is needed.

The function illustrated in FIG. 11 differs from the limiter function illustrated in FIG. 10 in that a color with the highest definition which exceeds the color space is compressed to the periphery of a reproducible color space and a little difference in the color with the next highest definition can be reproduced. In addition, the difference from the gamma correction is that the color space is not uniformly compressed and a contour line is wrinkled such that there is little change in the original color inside the color space. Since the gamut mapping is optional, it is possible to perform color management corresponding to the image.

The plate division data divided into C, M, Y, and K is converted into composite data in which one pixel has CMYK data (Step S108). Therefore, the plate division data can be easily converted into an RGB image. However, the color of ink is divided into C, M, Y, and K and the divided colors are controlled. Therefore, the conversion into the composite data is performed in the final stage after the conversion of all data has been completed.

The plate division data of each of C, M, Y, and K has a data value of 0% to 100% (255 grayscale levels) and is converted into RGB (255 grayscale levels) data by general computation equations as follows.

$$R = 1 - \min(1, C \times (1-K) + K)$$

$$G - 1 - \min(1, M \times (1-K) + K)$$

$$B = 1 - \min(1, Y \times (1-K) + K)$$

In this way, it is possible to display the converted image on the display screen of the image display means 11.

When CMYK data is converted into RGB data, an ICC profile for printing which is created from the actual printed matter is used in order to accurately reproduce a color in printing, which makes it possible to reproduce a correct color on the monitor. However, in this case, the monitor which is calibrated by the ICC profile is needed.

When this method is used, printing is performed using an ISO_IT.8.7 color chart while changing ink density in several stages and the ICC profile is created from the colorimetric value. In this way, it is possible to perform simulation.

When color conversion tables are supplemented by the ICC profile to create a plurality of ICC profiles, it is possible to perform simulation such that a change in color due to a minute change in ink density is substantially close to the actual color. A plurality of ICC profiles for a monitor, printing, and proof may be provided. However, it takes a lot of effort to create the ICC profile.

Therefore, when a monitor ICC profile table (reference color table) which converts data for the relation between various kinds of solid density of ink (CMYK) and L*a*b* (Step S110) and converts the color (L*a*b*) of ink with a reference density value into RGB colors (Step S112) is used, it is possible to simulate printing reproduction using the above-mentioned method. In this way, it is possible to improve the accuracy of simulation with the learning function using feedback from the measured value.

The simulation result is displayed on the display screen of the image display means 11 (Step S114). The image display means 11 is provided beside a printing press control device with a print viewer which is provided close to, for example, the printing press 100 and the operator can compare the images before and after the amount of ink supplied is corrected while viewing the color of the final contract proof or the printed matter. In addition, the operator can adjust the amount of ink supplied from each ink fountain of the printing press 100 using the printing press control device with a print viewer.

Figure 12:
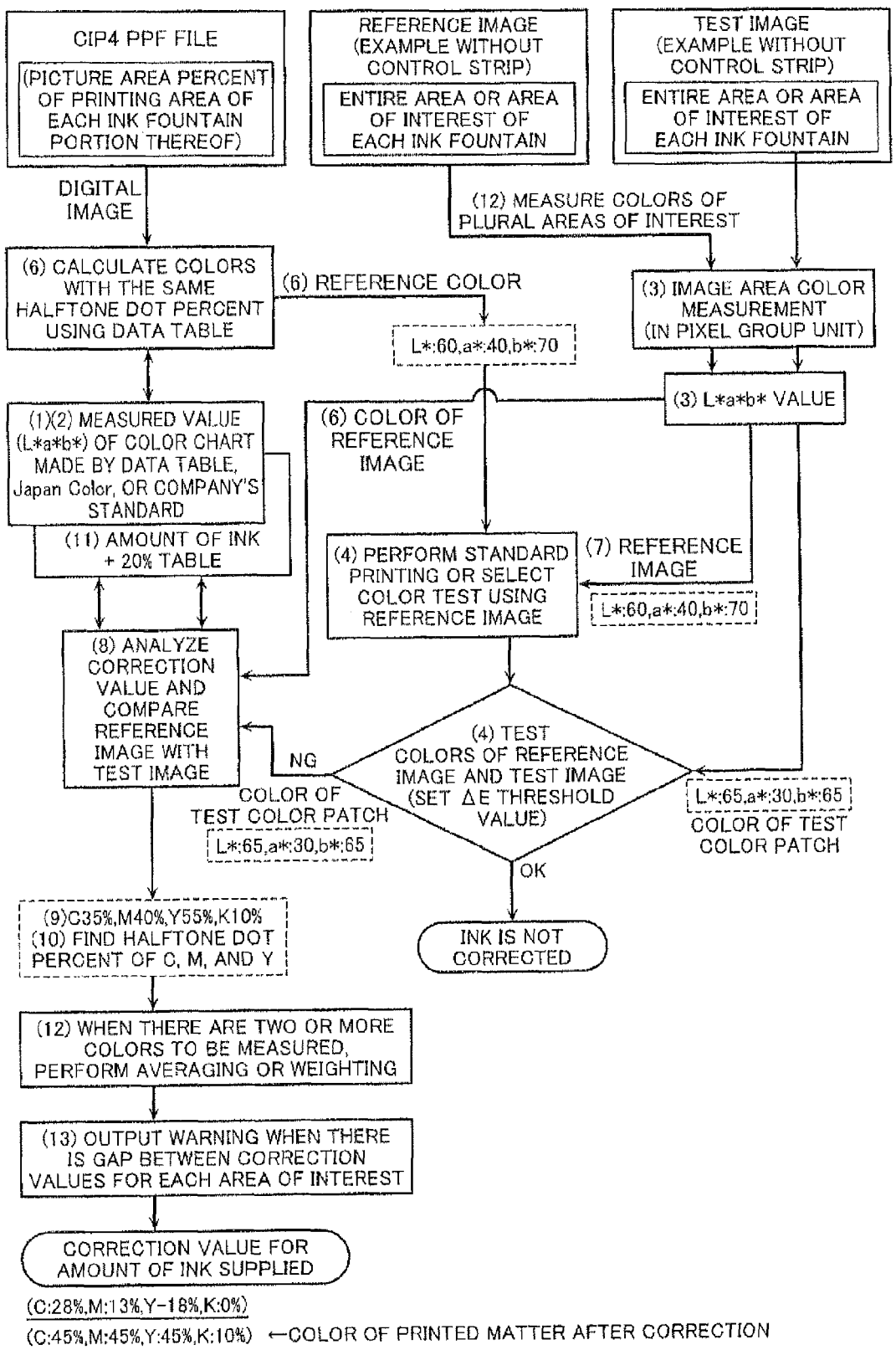
FIG. 12 is a diagram illustrating the workflow of color navigation in this embodiment.

Next, the workflow of color navigation (color matching) in this embodiment will be described with reference to FIG. 12. In this embodiment, as described above, image area color measurement is performed for the printing area (an area A1 represented by a one-dot chain line in FIG. 2 is an adjustment range managed by one ink fountain) covered by the ink fountain or a specific area (a frame area A2 represented by a thick line in FIG. 2) of the picture using the L*a*b* value. In this way, it is possible to accurately reproduce the difference between the reference image, which is the image of the proof sheet, and the evaluation image (test image), which is the image of the printed test sheet, based on the evaluation result such as the color difference ΔE. Therefore, it is possible to know the amount of correction of the evaluation image.

The direction of the color to be corrected can be checked by comparing the L*a*b* values of the pixels or the pixel groups of the reference image and the test image in the printing area covered by each ink fountain to calculate a color difference average. This embodiment is characterized in that it is possible to adjust the color of each printing area covered by each ink fountain even when the control strip S1 is not used.

When the specific area A2 (one or more specific areas need to be provided in each ink fountain area when the control strip is not used) is included in the printing area covered by each ink fountain, the image area color of a portion of the specific area A2 or the area of interest I4 in the picture is measured to perform color correction which puts emphasis on the matching between the colors. Here, it is assumed that the color of the area of interest I4 is corrected.

Next, the workflow will be described. In FIG. 12, a number in parentheses correspond to a step with the same number which will be described below. First, (1) a data table is made in advance which is obtained from the measurement result (L*a*b* values) of color charts which are printed with a standard amount of ink based on Japan_Color, which is a Japanese printing color standard, standard printing conditions (for example, the kind of ink, the kind of sheet, and the reference density of ink of each color) of each printing company, and other public institutes and the amount of ink that is 20% (the maximum thickness of an ink film which can be printed) more than the standard amount of ink.

Then, (2) even when printing is performed with standard printing density higher than a reference value, the use of the data table makes it possible to find a specific color from the color chart. Therefore, a correction value for the amount of ink supplied is calculated.

Then, (3) color measurement (L*a*b* value) for the reference image and the test image is performed. (4) The color difference ΔE between the reference image and the test image is checked. When the color difference ΔE is greater than a predetermined threshold value, it is necessary to analyze the correction value. On the other hand, (5) when the standard printing color based on Japan_Color is used as a reference color, the picture halftone dot percent (%) of the printing area covered by each ink fountain is calculated from each CMYK image of the CIP4_PPF file.

(6) A color (L*a*b* value) with a CMYK tone value equal to the calculated picture halftone dot percent on the color chart is found from the data table and is used as the reference color. (7) Before a test, it is selected whether a target color is based on a "standard printing color" or a "test image color". (8) In the comparison between the colors (L*a*b* values) of the reference data and the test data, when a color is extracted from the data table, the factor of black (K) ink is fixed, which makes it possible to easily find the tone value of each of C, M, and Y.

(9) The tone value of a black ink can be derived from the same position of the image data in the CIP4_PPF file. Then, (10) the difference between the tone values of the reference data and the test data is calculated. Therefore, the amount of each color ink supplied can be represented by a correction value (%). (11) When the color of the test data is not found from the color chart of the data table, a data table is used which is made by measuring the colors of a color chart which is printed with the amount of ink that is 20% more or less than the reference amount of ink. In this case, it is possible to find the closest color from the data table.

(12) When there is a plurality of color measurement points in one ink fountain, a color correction amount is averaged or weighted to calculate a total color correction value. In this way, it is possible to perform color matching which puts emphasis on the color of the area of interest. (13) When there is a plurality of areas of interest and the correction values of the areas of interest are divergent, the above-mentioned warning is output to prompt the operator to check the divergence.

As described above, portions with the same color in the reference image or the standard printed matter, such as a color chart, and the printed matter of the test image can be compared with each other to find the same color (L*a*b*) from the color patch of the data table and the correction value can be calculated by the following computation using the halftone dots. For example, the following computation expression can be used to utilize the calculated correction value as a correction value for the amount of ink supplied.

Test image color (*CMYK* halftone dot %)−target color (*CMYK* halftone dot %)=correction value (*CMYK* halftone dot %)

Correction value (*CMYK* halftone dot %)÷target color (*CMYK* halftone dot %)=correction value for the current amount of ink supplied (%)

An example of calculation using the above-mentioned computation expression will be described below.

(Example of Calculation)

(*C:* 45%,*M:* 45%,*Y:* 45%,*K:* 10%)−(*C:* 35%,*M:* 40%,*Y:* 55%,*K:* 10%)=(*C:* 10%,*M:* 5%,*Y:* −10%,*K:* 0%)

(*C:* 10%,*M:* 5%,*Y:* −10%,*K:* 0%)÷(*C:* 35%,*M:* 40%, *Y:* 55%,*K:* 10%)=(*C:* 28%,*M:* 13%,*Y:* −18%,*K:* 0%)

In this embodiment, the image display means 11 displays a simulation image when the correction value obtained by the above-mentioned computation expression is applied and a reference image on the display screen alternately or side by side such that the operator can view the images on the print viewer. Then, when the operator determines that there is not a problem in the correction result, the user inputs a correction value for each ink fountain through the print viewer to adjust the amount of ink supplied and performs test printing.

In the adjustment of the ink fountain, when there is a picture or a photograph which is arranged from the ink fountain area to another ink fountain area, so-called ink fountain periphery correction which performs the same correction for adjacent ink fountain areas at the same time is performed to prevent a change in the color tone of the picture or the photograph.

Then, the printed test sheet is compared with the reference sheet again by the above-mentioned process. When the color difference ΔE is equal to or less than a predetermined threshold value, the correction value is stored as data in, for example, a storage means and a production run is performed. In addition, various kinds of data, such as reference data, evaluation target data, print data, and original plate data, are stored as electronic data in the storage means so as to be associated with the color measurement result including the L*a*b* value or the evaluation result including the correction value.

Figure 13:
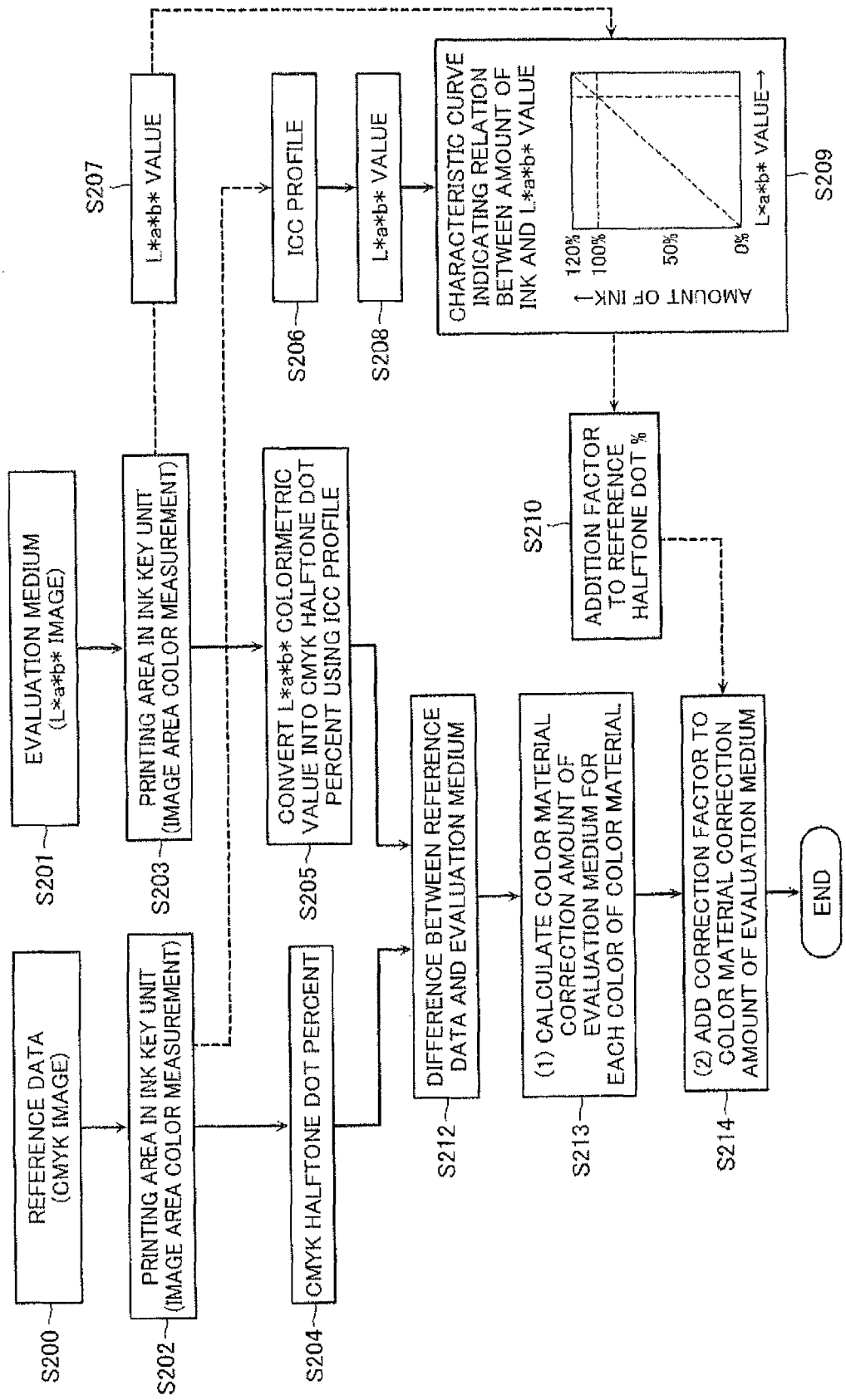
FIG. 13 is a diagram illustrating another flow of a process for calculating an ink supply amount correction value in this embodiment.

Next, another method of obtaining the ink supply amount correction value (correction value) will be described. FIG. 13 is a diagram illustrating another flow for calculating the ink supply amount correction value in this embodiment. In this method, when the color of a solid (the halftone dot percent is 100%) color patch is greater than the reference value, a value which is calculated as a change in the amount of ink from a change in density (or the L*a*b* value) when the amount of ink is increased or decreased with respect to the reference color is added as an index to each measured amount of ink.

The ICC profile for printing indicates the relation between the L*a*b* value and a color obtained by the multiplication of the CMYK halftone dot % in a color space based on a color with specific solid (the halftone dot percent is 100%) density in C, M, Y, and K inks. Therefore, to the contrary, under the same printing conditions, the use of the ICC profile makes it possible to convert the measured L*a*b* values of the picture into each color component (halftone dot %) of C, M, Y, and K. Even when printing density is different from the reference value, it is possible to check a difference in the amount of C, M, Y, and K inks corresponding to an increase or decrease in color with respect to the reference value in terms of the halftone dot %.

However, in the method using the ICC profile, even when the color of a solid patch and the color of a portion in the vicinity of the solid patch are converted into the CMYK halftone dot %, the difference is converted to be less than the actual value. Therefore, for example, even for a color more than the halftone dot of 100%, the calculated value does not exceed 100%. Therefore, when the following method is used to correct them, it is possible to represent the difference in the amount of ink between the reference image and the test image of the solid patch and a color portion in the vicinity of the solid patch.

First, a CMYK image is obtained from the reference image of the reference data (Step S200) and an L*a*b* image of the evaluation medium is obtained (Step S201). Then, image area color measurement is performed to measure the colors (L*a*b*) of pixel groups of the reference image and the test image in the image ranges which are divided in the width direction of each row of ink keys (about 20 to 30 ink keys are arranged in the lateral direction) for controlling the amounts of ink supplied from the CMYK ink fountains of the printing press 100 (Steps S202 and S203).

Then, the CMYK tone values are calculated based on the color measurement result of the reference data (Step S204) and the L*a*b* colorimetric values based on the color measurement result of the test image are converted into the CMYK tone values by the ICC profile (Step S205). In parallel to the steps, the color measurement result of the reference data is converted into an L*a*b* value (Step S208) with reference to the ICC profile (Step S206), and the L*a*b* value is obtained from the color measurement result of the test image (Step S207).

The reference data (reference image) obtained by totalizing the CMYK tone values obtained in Steps S204 and S205 is compared with the evaluation medium (test image) and the difference therebetween is calculated (Step S212). The ink supply amount correction values, which are evaluation medium color material correction values serving as the correction values for CMYK inks corresponding to each ink key, are calculated for each color of the color material of the evaluation medium (Step S213).

In addition, a characteristic curve (table) indicating a change in the amount of ink and a change in the density (or L*a*b*) value when the color of the solid patch is greater than the reference value and when the color is less than the reference value is made based on the L*a*b* values obtained in Steps S207 and S208 (Step S209). The characteristic curve table indicates, for example, the relation between the amount of ink supplied and color information. Then, an addition ink correction value of the solid patch for the measured value of the test image is calculated as an addition factor for the reference halftone dot % based on the table (Step S210).

Finally, the calculated addition factor (correction factor) is added to the color material correction value of the evaluation medium (Step S214). In addition, for colors other than the solid patch, the colorimetric values (L*a*b*) of the reference image and the test image are converted into the amounts of C, M, Y, and K inks by the following equation and the tone value, 0% to 100%, of digital data, which is the original image, is multiplied as the correction factor to add the additional ink correction value such that a portion with a small amount of ink is not multiplied by the additional correction value.

Additional ink correction value of $Y$ ink $= (b1^* - b0^*)/b0^*$;

Additional ink correction value of $M$ ink $= (a1^* - a0^*)/a0^*$;

Additional ink correction value of $C$ ink $= \sqrt{((a1^* - a0^*)^2 + (b1^* - b0^*)^2)}$ Additional ink correction value of $K$ ink $= (L1^* - L0^*)/L0^*$ ("a0*": the reference value (solid patch) of M ink–the value of white paper "b0*": the reference value (solid patch) of Y ink–the value of white paper "L0*": the reference value (solid patch) of K ink–the value of white paper "$\sqrt{(a1^* - a0^*)^2}$": the reference value (solid patch) of C ink–the value of white paper "L1*", "a1*", and "b1*": the measured value (L*a*b*) of the test image)

The calculated electronic data, such as the correction value, stored in, for example, the storage means can be appropriately used again by an electronic data storage function. The stored electronic data includes the L*a*b* value added to each pixel, in addition to the image data. Therefore, a huge space for storing the printed matter is not needed, unlike the related art.

In the related art, the stored printed matter is affected by temperature, humidity, or light according to the storage conditions of the printed matter and deteriorates due to, for example, expansion or contraction, a color change, or mold. However, the use of data having L*a*b* added thereto makes it possible to solve the problems. In addition, during re-printing, the stored electronic data serving as the original data can be used as color chart data in color matching with the printed test sheet.

In the related art, a value obtained by measuring the color of the area of interest in the printed matter can be stored, or an RGB image can be stored as the image. However, in an RGB camera system according to the related art, color reproduction varies depending on the individual cameras. In addition, since the entire gamut of the image cannot be recorded, it is difficult to accurately convert the color into L*a*b* values. Therefore, it is difficult to display a correct color on the monitor such as the display screen. A color chart for creating the ICC profile may be captured for color matching in order to calibrate the colors of various input devices during an imaging process. However, in this case, this is limited only to the range of the color gamut of the color chart.

When the L*a*b* image obtained by the image area color measurement of the XYZ-equivalent or spectroscopic wide range of color gamut input device is stored, the ICC profile of the input device is not needed. When the color of an output device, such as a monitor or a printer, is calibrated by, for example, the ICC profile, the color which does not vary at anytime and anywhere when the image is reused can be reproduced and output to the monitor or the printer. In this way, it is possible to provide an accurate color chart for a long time.

As described above, according to this embodiment, for example, the color of the set specific area or the area of interest in the image areas of the surface of the proof sheet and the printed test sheet is measured by the wide range of color gamut input device which can perform XYZ output and store data while the area is illuminated by the actual light source for evaluation. In this way, pixel group average color information obtained by measuring the color of each pixel group in the specific area is calculated as the color measurement result. Then, a color difference average value obtained by comparing the colors (L*a*b* values) of all pixel groups based on the color measurement result when, for example, the area of interest is divided into specific areas or matrix frames is calculated as the evaluation result. In this way, the difference between the colors of each portion of the image of the reference medium and the evaluation medium can be integrated as the color difference value and it is possible to obtain high color difference accuracy even in an image with a pattern or gradation. In addition, the color of a specific area or an area of interest, such as the color of a lipstick, a vehicle body, or a product package, is recognized as a surface such that the result of determining whether the color is good or bad is close to the determination result of the color by the human eye. Therefore, the color of an important point and the color of the entire image are compared with each other.

When the color of the image is determined by the human eye, the human does not compare colors while viewing the color of a point as a spot, but senses the color as a surface (since the color has shading) and determines whether the color is good. Therefore, the image area color measurement described in this embodiment is reasonable. In a case of the image area color measurement, for example, the area of interest can be subdivided and the size or shape (for example, the divided portion has a rectangular shape and the aspect ratio thereof can be changed) of the divided portion can be freely set. Therefore, the image area color comparison between the proof sheet, which is the reference image, and the printed test sheet, which is the test image, can be made, similarly to the human eye. In addition, in the case of the image area color measurement, for example, the evaluation can be made by an "average color difference" obtained by integrating the measured value of the entire area of interest and dividing the integrated value by the number of measurements. Therefore, this embodiment is not affected by a slight deviation between measurement positions and is particularly effective in, for example, an image such as a background pattern.

The use of the color measurement result or the evaluation result obtained by the image area color measurement makes it easy to separate the image of a black ink portion as a specific color material and to calculate the amount of ink. For example, as a method without a spectral filter, it is possible to separate black ink from each pixel of the image which is input by a wide range of color gamut input device, such as a digital camera or a scanner using a CIEXYZ equivalent filter, using a black ink portion of the digital image data (a PPF file, a PDF file, or a TIFF image) of the original plate.

In this case, specifically, for example, it is necessary to perform image matching to overlap the dimensions and the picture positions of the reference image and the evaluation image in advance, using the "reference image" input by the CIEXYZ equivalent camera and "data obtained by converting the "test image" from printing data into a PDF file or a TIFF image including C, M, Y, and K and a specific color" or "CIP4-PPF data" as the digital image data of the original plate.

The K images of the separated reference and evaluation images are separated in the printing areas of each ink key, or image area color measurement is performed for each pixel group in an arbitrary area, such as a specific area, to calculate the color difference average. That is, the L*a*b* values of the data items are compared with each other and a black ink correction value is calculated from the difference therebetween.

Therefore, it is necessary to make the above-described characteristic curve table indicating the relation between the amount of ink and the L*a*b* value in advance, in addition to a table (ICC profile) indicating the halftone dot % and the L*a*b* value in the reference amount of ink. In this case, it is possible to accurately calculate the amount of ink from the difference between the measured L*a*b* value of the test image and the L*a*b* value of the reference image. In addition, since the K image is separated to obtain the black ink correction value, it is possible to accurately analyze a combination of color materials for reproducing, for example, a gray picture in the image.

The use of the color measurement result or the evaluation result obtained by the above-mentioned image area color measurement makes it possible to easily perform the separation of the image of a specific color ink portion serving as a specific color material and the calculation of the amount of ink, in addition to the separation of a black ink portion and the calculation of the amount of ink. In the separation of the image of the specific color ink portion and the calculation of the amount of ink, image matching for overlapping resolution or dimensions and picture positions is performed for the "reference image" input by the CIEXYZ equivalent camera and the "data obtained by converting the "test image" from printing data into a PDF file or a TIFF image including C, M, Y, and K and a specific color" or the "CIP4-PPF data", and the image matching results for each pixel unit are compared with each other. In this way, it is possible to easily extract a specific color image in a portion which does not overlap the CMYK image.

For the amount of ink, the ink correction value of the test image is calculated for each pixel from the difference between the L*a*b* values in the image by comparing the color measurement results of the image area color measurement for the pixels of only a specific color from data for the "reference image" and the "test image" which are separated from each other. It is possible to perform conversion to an ink correction value for the color difference in the evaluation result using a table (for example, a table which is made for a printing test in advance) in which a change in the color (L*a*b* value) of each halftone dot % portion is associated with the amount of ink.

When there is a color obtained by image matching specific colors, the mixed color is created as the ICC profile in advance. In this case, it is possible to calculate a difference in the amount of ink for an image area in which there is only a specific color ink, similarly to the CMYK inks. However, when a table indicating the relation between the amount of ink of the solid patch and a color change is used for the obtained ink correction value, the ink correction value for a difference in color (L*a*b* value) in the vicinity of the solid patch is corrected. Therefore, it is possible to accurately predict the ink correction value.

The color measurement result or the evaluation result makes it possible to easily perform, for example, soft proof (which changes the display screen of the image display means 11 to a color proof screen and is also referred to as monitor proof) for evaluating the color of the image display means 11, in addition to the calculation of the ink correction value. There are many attempts to use the soft proof, but the soft proof has not been generally used and spread since only the visual sensory evaluation and comparison method is insufficient for quality assurance.

When a color is transmitted through the Internet, in general, a color reproducible area is narrow in any image display means having sRGB as a color reproduction area. Therefore, color reproduction is performed in a limited color gamut. In the advertisement, publication, and newspaper industries including color printing or package printing, AdobeRGB (registered trademark) which substantially responds to printing reproduction with a relatively wide range of color gamut has been used. In recent years, a laser TV with a color gamut close to the color gamut (visual color gamut) of the human eye has been commercialized and the soft proof is advantageous in terms of quality or costs.

In the color information processing apparatus 1 according to this embodiment, in order to further improve the color reproduction accuracy of the color proof screen, the color management of the image display means 11 is performed by measuring the color of the entire display screen using the image area color measurement, unlike the related art in which color adjustment is performed only for the center of the display screen. In addition, since the color of the color proof screen is viewed while being changed due to the influence of external light, an evaluation light source for control which can control the influence of external light reflected from the screen or the colors of the screen is attached to the image display means 11 and emits light. In this way, the color of the entire screen is managed.

In general, for the color measurement of the image display means 11 (for example, a color monitor), first, about 27 to 125 colors (colors which can be reproduced by combinations of several stages in which the RGB signal values are from the minimum to the maximum (from 0% to 100%, for example, 0%, 25%, 50%, 75%, and 100%) and RGB values) of the center of the screen are measured.

Then, a color table, which is an ICC profile in which RGB input signals and the color reproduction of the color proof screen are associated with each other, is made to control the color reproduction of the screen. However, this is not sufficient, as compared to a case in which the profile is created based on a color control patch of 800 or more colors as in printing.

Furthermore, screen unevenness on the color proof screen is not considered, and the color reproduction depends on the performance of the image display means 11. In addition, the color which is viewed varies depending on the position or angle where the person who performs evaluation views the monitor. An image portion of the screen which is viewed is affected by the color of a portion in the vicinity of the image portion. When the color is viewed by the eyes, a color contrast with the color of the picture to be evaluated occurs and the color looks different.

For example, when the color temperature of the color proof screen, the color temperature of external light, or an illumination wavelength spectrum varies, the white of the screen varies. In addition, when light is reflected from the screen due to the influence of external light, contrast is reduced or the color looks different. When the screen is viewed at a short distance or when a large screen is viewed, the point of view at the center of the screen is greatly different from that in the periphery of the screen. Therefore, colored light is not uniformly viewed and the color or brightness looks different.

Figure 14:
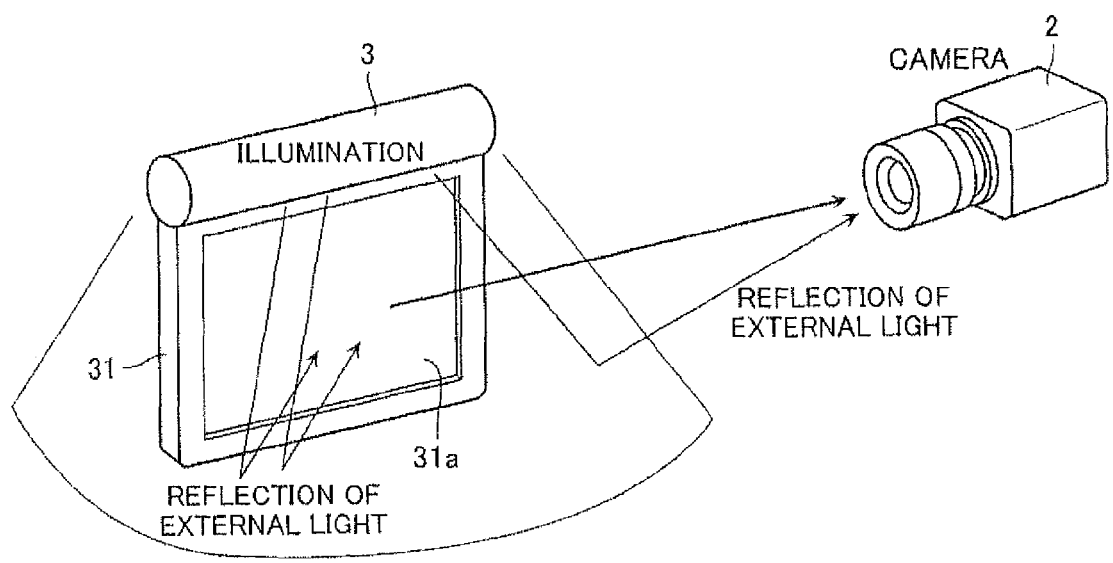
FIG. 14 is a diagram illustrating monitor proof by a color information processing method according to a second embodiment of the present invention.

Next, a second embodiment will be described. This embodiment relates to a color information processing method using monitor proof. As illustrated in FIG. 14, in this embodiment, a color difference between two reference charts, that is, a screen on which reference chart data (a color chart for creating a proof ICC profile of about 1000 colors obtained by the multiplication of the CMYK halftone dot %) is displayed and image data corresponding to a reference chart proof (sheet), which is a base of the screen, input by a camera 2 which is a wide range of color gamut input device is calculated by a calibrated monitor display 31, and a "basic monitor profile" for correction for matching the color reproduction of the monitor screen with the color reproduction of the proof is created. In addition, for example, a monitor color temperature conversion profile from 5000 K to 6500 K or a sheet profile may be simultaneously used to adjust the color of the monitor.

The reference image data is displayed on the monitor screen 31a and is input by the camera 2 (wide range of color gamut input device). In this way, a reference image is obtained by the basic monitor profile.

At that time, in order to perform control such that the color displayed on the monitor is not affected by external light, a monitor hood may be attached or illumination light may be forcibly emitted from an illumination source 3 to the monitor so as not to interrupt the field of view of the operator.

The process of this embodiment is performed as follows.

(1) A monitor evaluation proof is input in a wide range of color gamut under a standard light source to obtain an evaluation image.

(2) Scale size adjustment and positioning are performed for files of the reference image and the evaluation image and image matching is performed for the images on each other.

(3) A monitor screen is divided in a matrix, image area color measurement is performed, and the value of color difference ΔE is displayed. In this case, for example, a color, a sound, or a voice indicating whether the color difference is less or more than a predetermined reference threshold value is displayed or output. In this way, the color display accuracy of the monitor is guaranteed.

When the process is performed, screen unevenness correction is performed such that the color reproduction of the entire monitor screen is uniform, in addition to the general calibration of the monitor. As an execution method, the colors of the color chart used to create the ICC profile are display one by one on the entire surface of the monitor and the images of 5×9 portions obtained by dividing the screen of the monitor are captured by one shot or 45 (5×9) shots of the wide range of color gamut camera. When the images are captured by a plurality of shots, an automatic imaging operation is performed by a method of moving the camera in the X and Y directions using a robot or a method of changing the accuracy of the camera such that the center of a camera screen is aligned with the center of each of the divided screens. The former multi-shot method is advantageous in uniformly correcting the screen and is suitable for a case in which the wide range of color gamut image input device measures the colors of the monitor and a printed matter and compares the measured values. The latter multi-shot method is characterized in that color calibration including a change in the color reproduction of the monitor is performed in the actual environment in which the observer views the monitor. When the color of the monitor is measured by the same method as the monitor color measurement method during calibration, the measured values can be compared.

Then, a CMKY image is divided into monitor screens by the monitor ICC profile (which is made for a proofer) which is created by the above-mentioned methods, a printing profile is set to each image, and the colors of the images are converted into L*a*b* images. The images are composed into one image and the composed image is displayed on the monitor. In this way, an image is finally displayed on the entire calibrated screen of the monitor.

In this embodiment, the wide range of color gamut image input device which can stabilize the color reproduction of color display and directly measure the color of the screen of the monitor as the L*a*b* value while performing color management using the generally used ICC profile is used to achieve monitor proof capable of improving the accuracy of printing color proof. In order to achieve the monitor proof, the following are needed, in addition to the method according to the related art in which the color management of the monitor screen is performed only at the center of the screen:

(1) An image area color measurement technique is applied to calibrate the entire surface of the monitor;

(2) A difference in the vision of a color in an environment in which color evaluation is performed considering the influence of external light is corrected; and (3) The color of the monitor is directly measured, considering the influence of a picture surface displayed on the monitor and external light or while adjusting external light and the color of the image is evaluated by the measured value.

Next, a third embodiment of the invention will be described. This embodiment provides a system which performs quantitative color management suitable for a monitor color evaluation environment.

Figure 15:
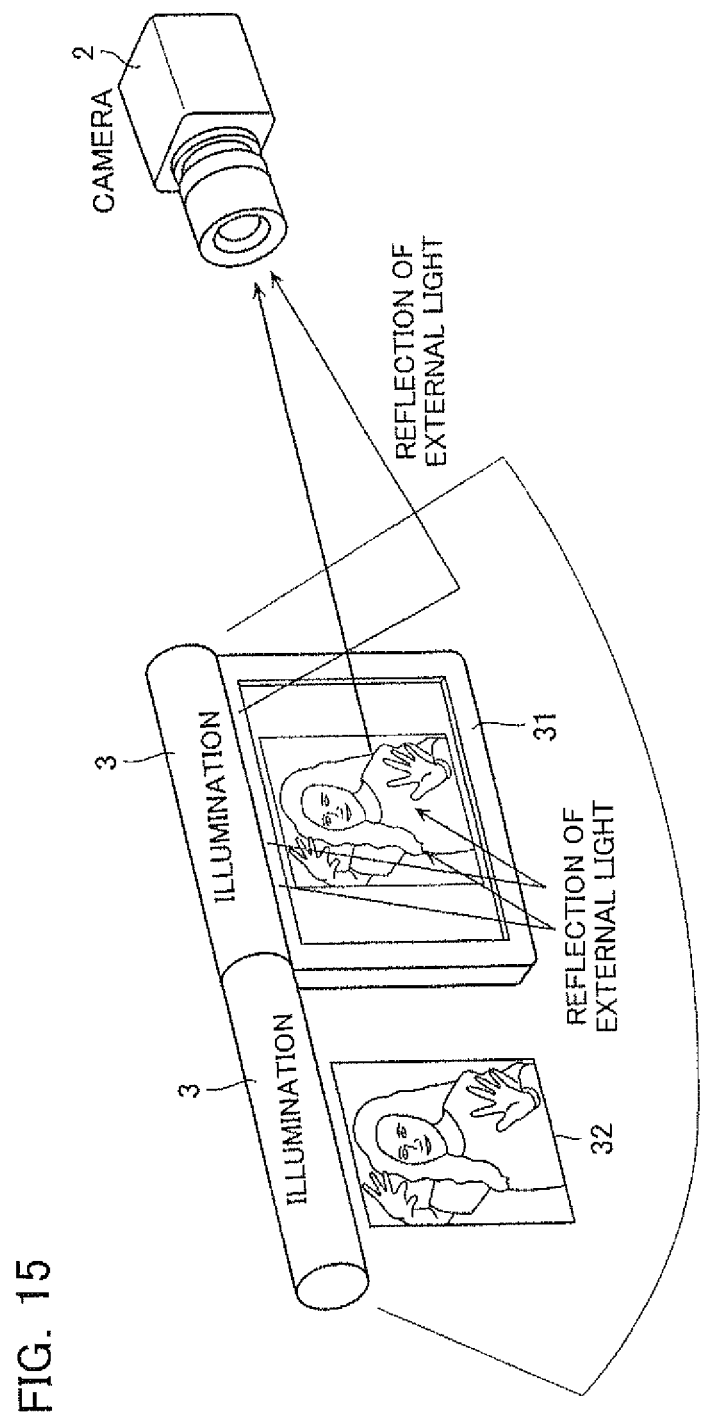
FIG. 15 is a diagram illustrating quantitative color management suitable for an environment in which the color of a monitor is evaluated by a color information processing method according to a third embodiment of the present invention.

As illustrated in FIG. 15, when color matching between an object (for example, a printed matter, a print, an input, all objects which can be captured, animals and plants, and scenery) 32, such as a printed matter, and a monitor display 31 is performed, it is assumed that the color temperature of a display screen and screen unevenness are corrected and a monitor ICC profile is used to perform the color matching. Then, both the adjusted display image and the image of the printed matter and the object are input to various kinds of wide range of color gamut image input devices capable of inputting images with a correct L*a*b* value and image matching is performed to equalize the sizes of the image equal. A pixel color difference average or a pixel group color difference average in an arbitrary area which is desired to be compared in the image-matched pixel or pixel group is represented by ΔE or a color frame. If there is an image portion in which a color difference between the captured images of the object and the monitor is beyond a predetermined allowable range (for example, ΔE), a warning is output to prompt re-correction, or the color difference is fed back to a prepress process or a design process as in a fifth embodiment, which will be described below. In this case, the color difference is converted into CMYK data using a reference color table. As such, color measurement and quality assurance for the entire screen of the color monitor are needed in order to achieve the color management of the monitor proof.

(1) The entire screen including the colors which can be reproduced by combinations of several stages in which the RGB signal values are from the minimum to the maximum (0% to 100%) and RGB values is input to the entire surface of the monitor by various wide range of color gamut image input devices under a printing color evaluation light D50 or D65 or in an environment suitable for the arbitrarily set color temperature of the monitor. This process is performed on several tens of colors.

Then, after the RGB values are converted into L*a*b* values, an ICC profile is created for each block of the screen which is divided into a matrix (for example, 10×10 blocks) by image area color measurement and calibration is performed for each block of the entire surface of the monitor.

(2) In this way, it is possible to correct a difference in the vision of a color in an environment in which color evaluation is performed considering the influence of external light. In addition, as a method of controlling external light, digital image data, such as a proof or a printed matter to be evaluated, is displayed on the calibrated monitor under the light D50 or D65 or in the same illumination environment as that of an external light source in the place where the monitor is provided.

(3) The picture surface displayed on the monitor is directly measured by a wide range of color gamut input device (for example, a CIEXYZ equivalent camera or a spectroscopic camera) and the color which is viewed by the eye is evaluated by a numerical value such as L*a*b* or ΔE.

(4) In order to limit and unify the influence of external light on the monitor, the following method is effective in which illumination light with the color temperature or the spectroscopic spectrum to be evaluated is emitted to the screen of the monitor from one or more of the left, right, upper, and lower sides of the monitor to control the influence of external light.

Next, a fourth embodiment will be described.

Figure 16:
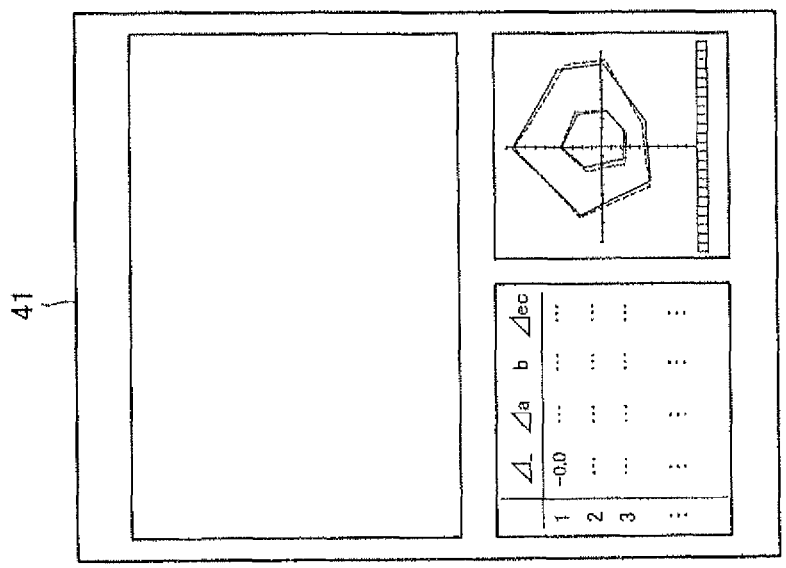
FIG. 16 is a diagram illustrating a color quality evaluation certificate by a color information processing method according to a fourth embodiment of the present invention.
Figure 16:
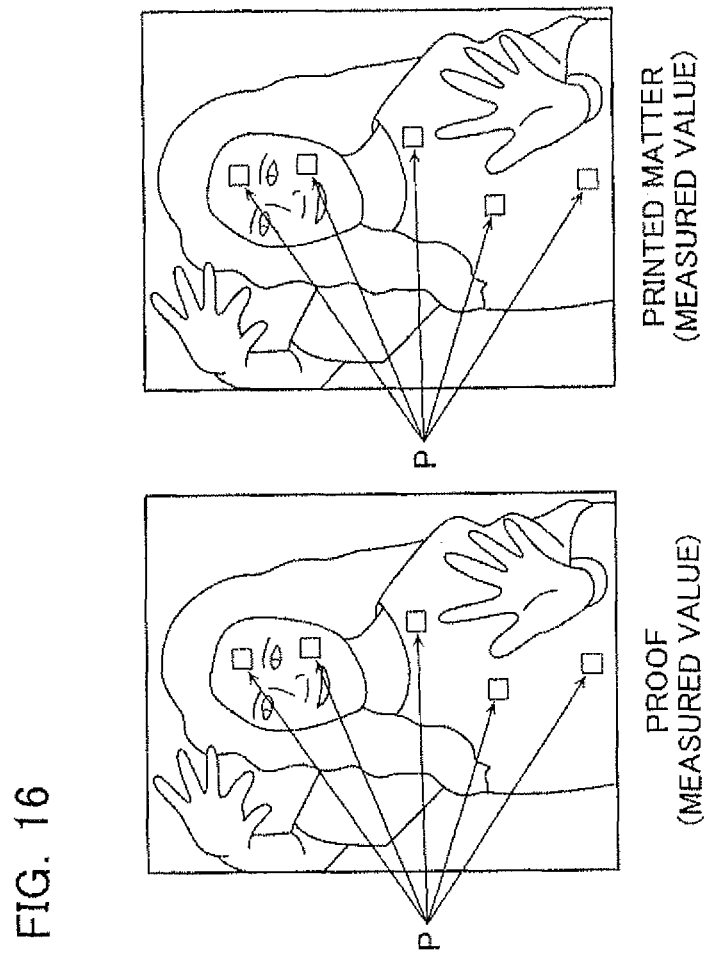
Figure 17:
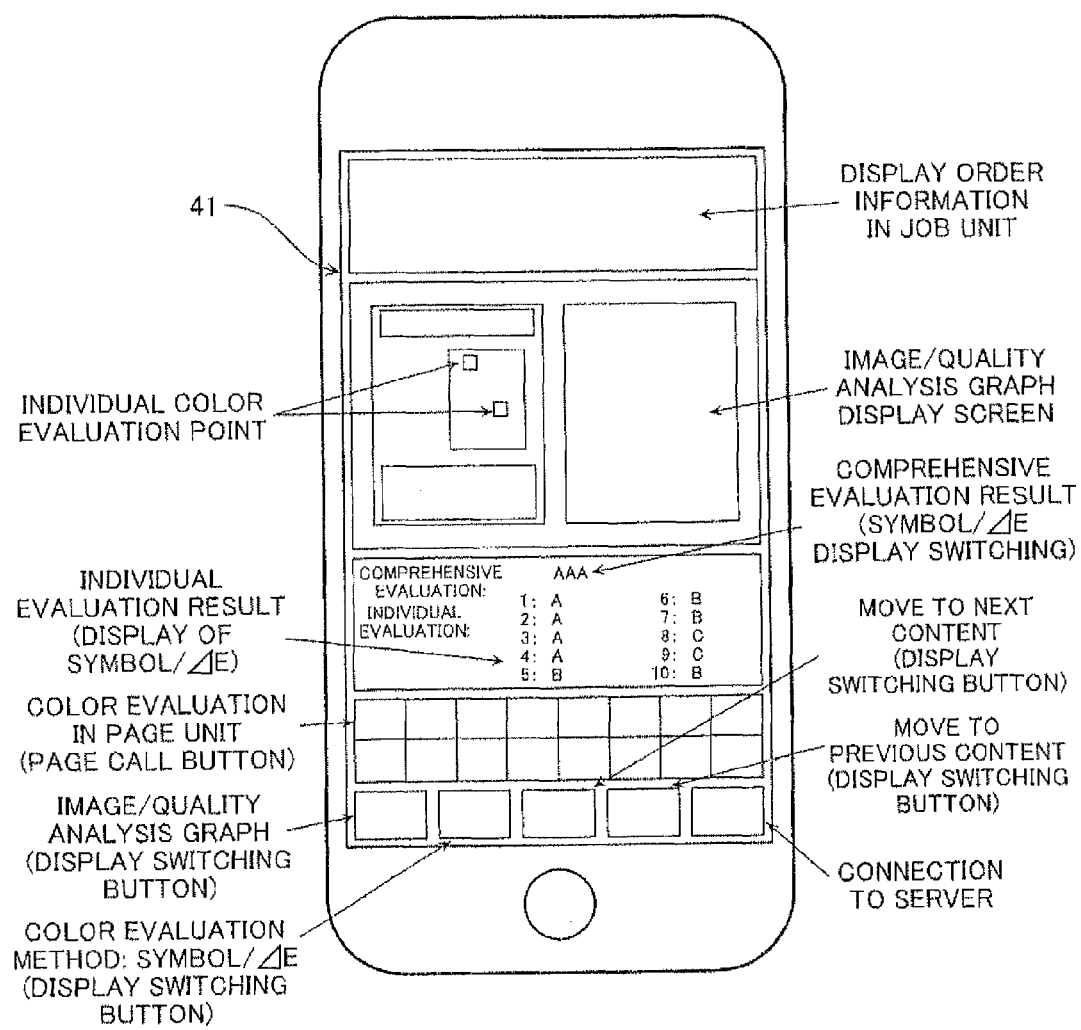
FIG. 17 is a diagram illustrating the same color quality evaluation certificate.
Figure 18:
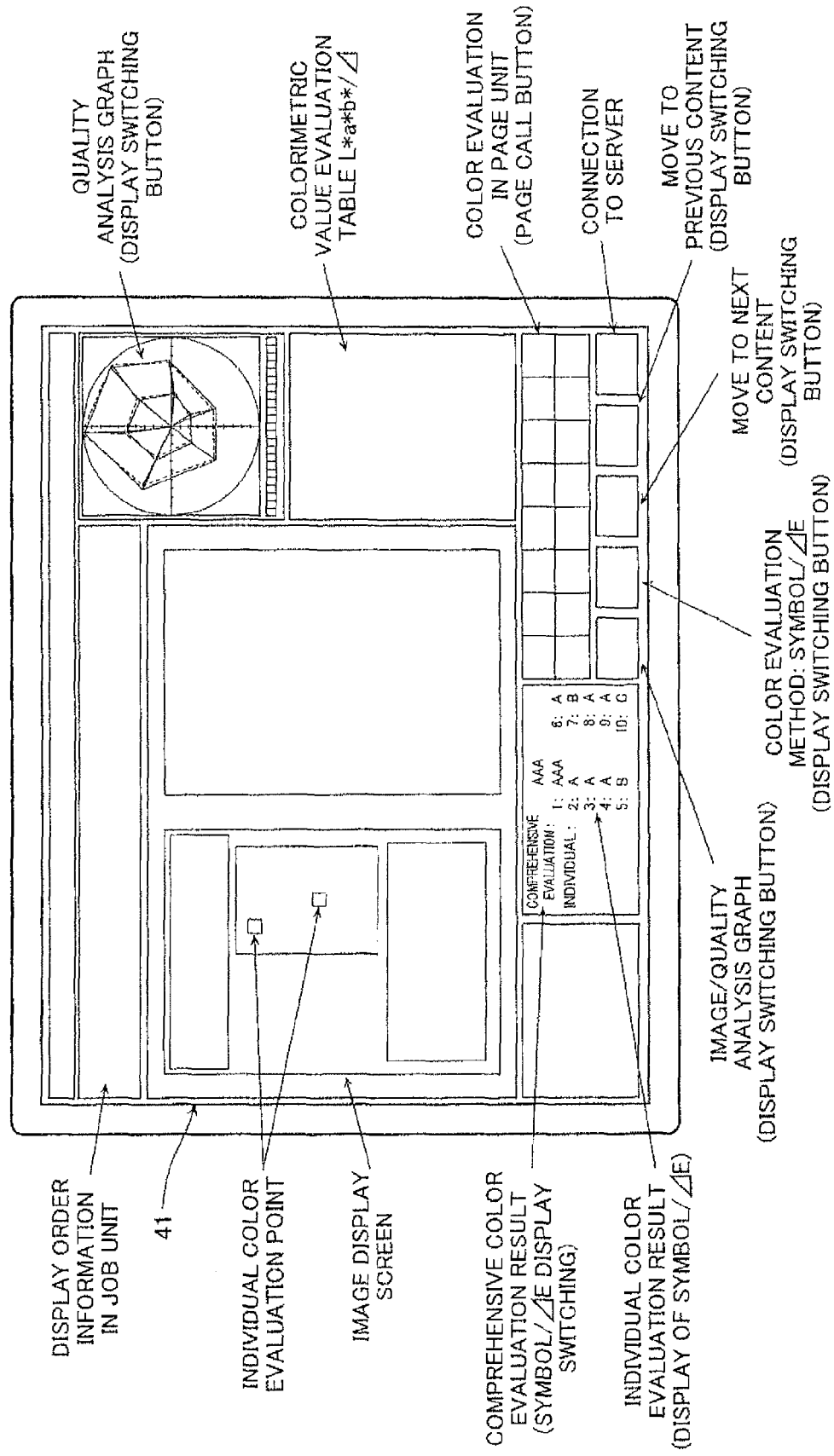
FIG. 18 is a diagram illustrating the same color quality evaluation certificate.

As illustrated in FIGS. 16 to 18, in this embodiment, a color evaluation table indicating the L*a*b* value of a reference medium, the L*a*b* value of an evaluation medium, and a color difference is calculated for several specific areas P per page. This table is sent as a color quality evaluation certificate 41 to a customer or stored in a transmission server.

In addition, a general notation system in which ΔE is divided into levels using English letters, such as AAA, AA, A, B, C, and D or an evaluation symbol, such as ★★★, may be added to the color quality evaluation certificate 41 which indicates the L*a*b* value of the reference medium, the L*a*b* value of the evaluation medium, and the color difference. The color quality evaluation certificate 41 may be displayed on a display screen of a mobile terminal illustrated in FIG. 17 or a PC illustrated in FIG. 18.

The color quality evaluation certificate 41 includes, for example, order information about each job indicating print job information, images, such as a reference image and an evaluation image, a quality analysis graph indicating a quality analysis result, an individual color evaluation position indicating an individual color evaluation position, a numerical color evaluation table indicating color evaluation with an L*a*b* value or the value of the color difference ΔE, a comprehensive color evaluation result (which can change to evaluation symbol/color difference ΔE display) indicating a comprehensive color evaluation result, and an individual color evaluation result (which can change to evaluation symbol/color difference ΔE display) indicating the result of individual color evaluation. In addition, for example, various kinds of display change instruction buttons, a page call button, and a button for instructing connection to the server are displayed at the same time on the display screen of a terminal on which the color quality evaluation certificate 41 is displayed.

In some cases, the client makes a claim for the color of a printout, such as a delivered printed matter or print. This is because the client compares the color of the delivered printed matter or print with the color of a proofread sheet which is called a "final contract proof" and recognizes the difference between the colors. As a solution to a difference in the recognition of colors between the printing company and the client, color evaluation is performed by the image area color measurement method with the internationally-defined numerical values (for example, the L*a*b* values). One or a plurality of portions of the picture for which the client wants to perform color matching are marked with, for example, small rectangles, the colors of the portions are checked on the monitor, the allowable range of the color difference is represented by numerical values, and image area color measurement is performed for the final contract proof and the printed matter to be delivered.

The marked instruction data and image are also transmitted as digital data to a printing factory and the amount of adjustment of each ink color supplied to the printing press is displayed, which enables the operator to reliably perform a color adjustment operation. The actual color reproduction varies depending on conditions, such as the ambient temperature and humidity of the printing press, the blanket pressure of the printing press, and dampening solution. Whether the color reproduction is within the allowable range can be numerically determined by the image area color measurement. Therefore, it is possible to perform accurate color adjustment.

Therefore, the color reproduction which the client wants can be achieved. The L*a*b* value and the color difference of the same measurement portion which is instructed to be marked in the final contract proof and the printed matter to be delivered are attached as a color quality certificate and the printed matter is delivered to the client. Therefore, the client can receive the printed matter with an easy mind. In this way, when the ordering party and the printing company determine the allowable range of the color difference, it is possible to remove color trouble.

Next, a fifth embodiment will be described.

Figure 19:
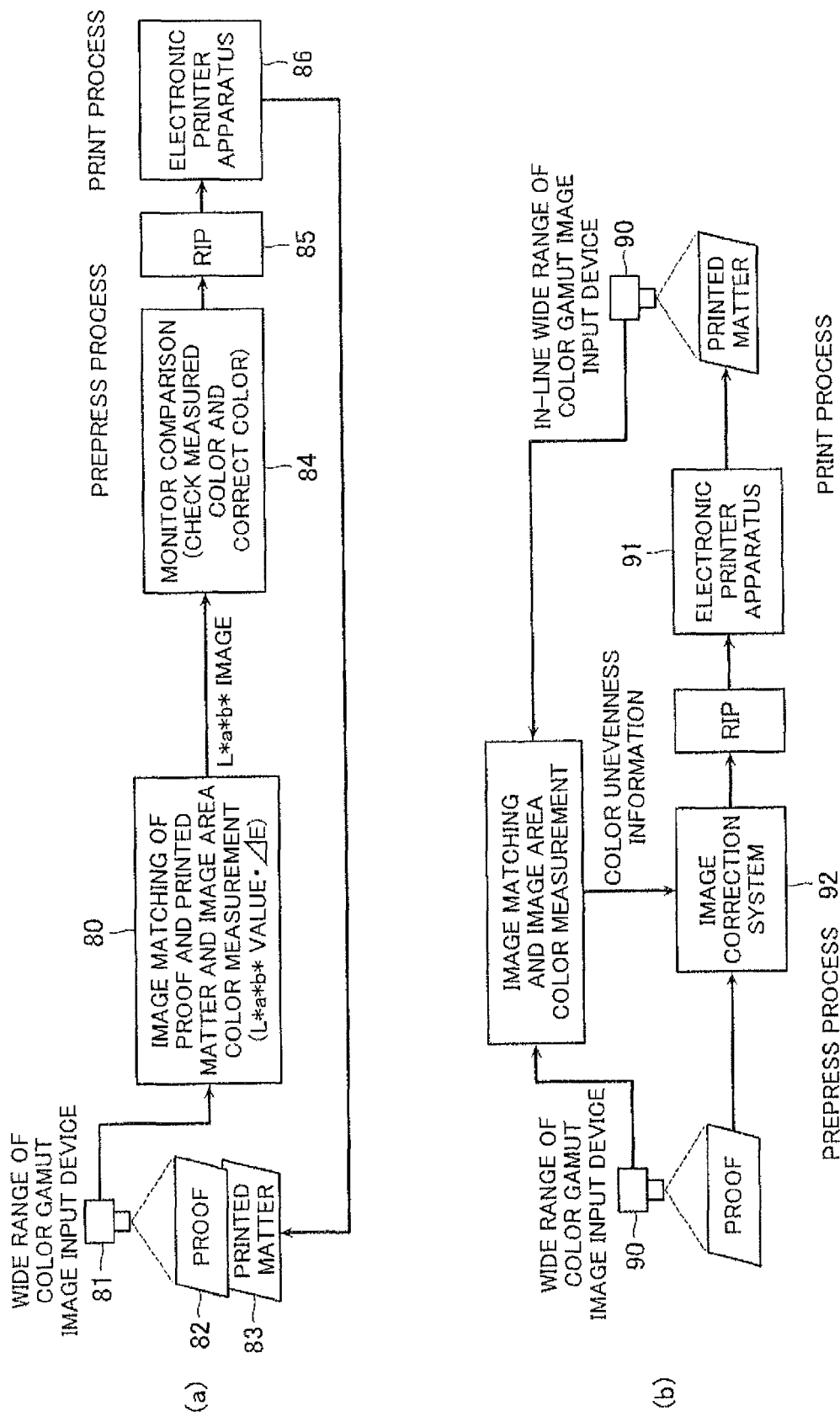
FIG. 19 is a block diagram illustrating the color correction of an electronic print by a color information processing method according to a fifth embodiment of the present invention.

FIG. 19 is a block diagram illustrating the color correction of an electronic print. FIG. 19(a) illustrates color reproduction using feedback to a prepress process and FIG. 19(b) illustrates in-line color measurement and color correction.

(1) Guarantee of Color Reproduction Using Feedback to Prepress Process

As illustrated in FIG. 19(a), little surface unevenness occurs in a print which is output from a digital printing means, such as a POD (Print On Demand) apparatus or a printer, but it is difficult to control a minute difference in color reproduction in the picture using only the ICC profile which is created from a color chart during printing. Therefore, it is difficult to perform sufficient color matching and thus sufficient respond to the quality needs of the client.

Therefore, when there is a difference in the color reproduction of a print, the color of image data needs to be corrected in the prepress process. In order to meet the requirements, image area color measurement is performed for a specific color of the picture surface of the print, which makes it possible to stably obtain the L*a*b* values even when a color change, such as gradation, occurs.

An image input device 81 is provided in a POD apparatus 80. The "image (proof 82) of a print" is input and is image-matched on "print data (printed matter 83)". The screen is freely divided into a matrix or an area of interest is designated. A pixel group color difference average or a pixel color difference average is calculated based on the color difference calculated from the L*a*b* values of the area.

A simulation for matching the color of the screen with a reference color is performed based on the calculated value and the color difference and the image thereof are displayed on a monitor screen 84. A simulation image value is fed back from the determined screen to the original print image and a RIP 85 forms an image from the color-corrected print or the original image and an adjustment value. Then, the image is printed by a printing press 86. Alternatively, a printer with an editing function for color adjustment is used to perform color adjustment. A series of operations may be automated by predetermined conditions or numbers. When the client makes a claim for the color correction of the print, this process is repeated.

(2) In-Line Color Measurement and Color Correction Method

As illustrated in FIG. 19(b), an input device 90 which can input data at a high speed is provided as an in-line color adjustment device in the printing press 91 and the POD apparatus 92 and calculates a color difference in one or a predetermined number of printed matters or prints and a difference in the amount of C, M, Y, and K inks of the printing press 91 or a difference in the toner or color material of the printer.

In addition, for the printer or the POD apparatus, the output of the image to be printed is adjusted in a dot or pixel unit based on the color difference between the reference image and a comparative image to increase or decrease the amount of color material (for example, toner or ink) used, thereby performing color correction.

A line-scanner-type wide range of color gamut element, a filter, or an LED which emits light in a wide range of color gamut is provided in the printing press 91 or the POD apparatus 92 and inputs the image which is being printed at a high speed. The input image is divided in an ink fountain unit or in a matrix shape, the reference image and the image which is input at a high speed are image-matched on each other at a high speed, and the color difference thereof is instantly calculated. The density of ink or the color material is adjusted in a printing ink fountain or a matrix unit based on the color difference value, thereby correcting the printing color. This situation is displayed in the adjusted colors on the monitor, and the colors of the printing press 91 and the POD apparatus 92 are adjusted from a color change history, such as a reference value or printing color check. Then, a graph is displayed on the monitor.

Next, a sixth embodiment will be described.

Figure 20:
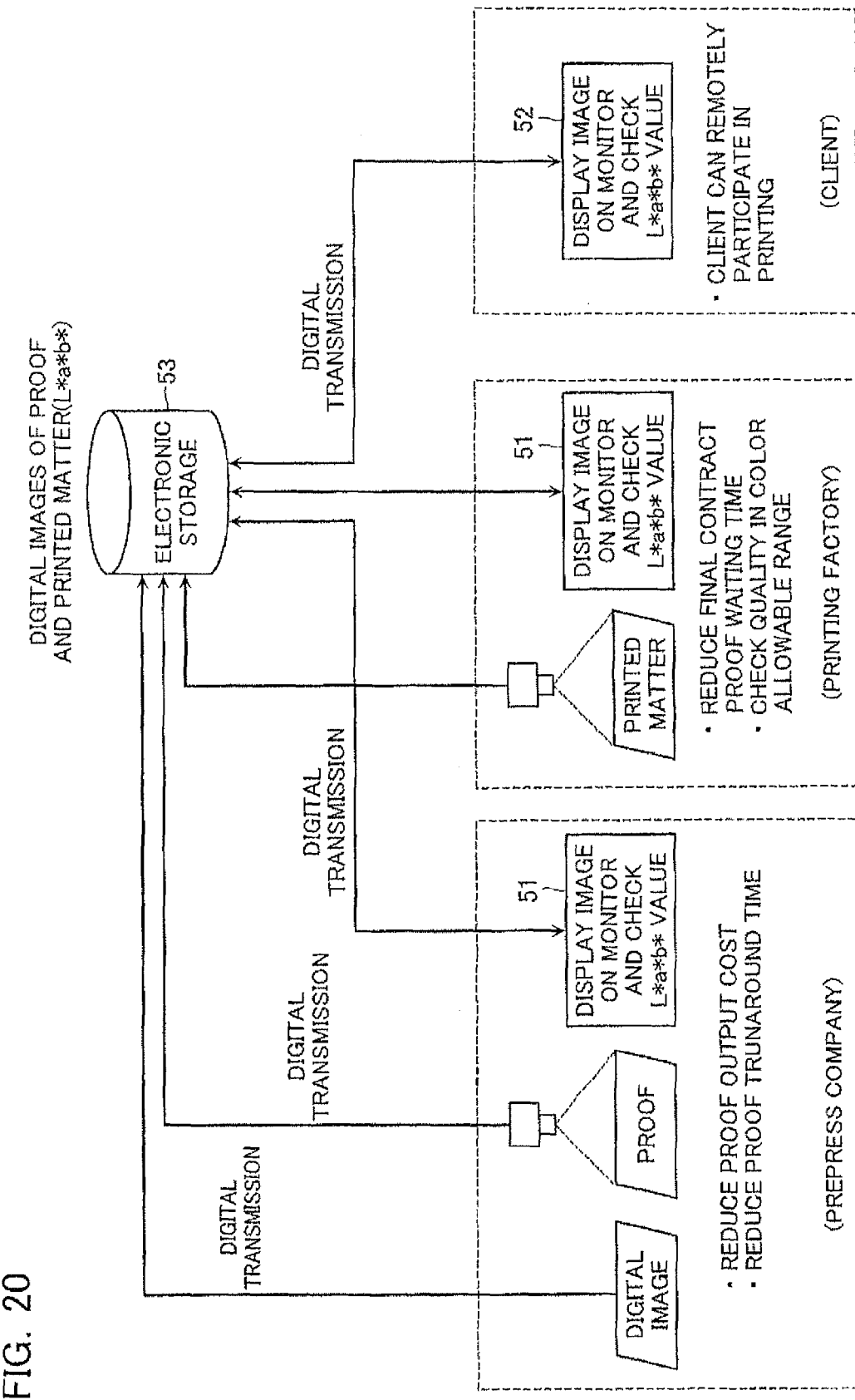
FIG. 20 is a block diagram illustrating an on-line color proof system using a color information processing system according to a sixth embodiment of the present invention.

FIG. 20 is a block diagram illustrating an on-line color proof system.

An on-line color proof is an indispensable technique for simplifying a printing process or a print manufacturing process, improving operational efficiency, and reducing costs. In order to reduce a difference in display between a reference monitor 51 which is provided in a prepress company and a printing factory and a monitor 52 which is used by the user, a color reference chart is displayed on the entire screen of the monitor or the center of the monitor screen, a color measurement device is used to measure colors, and an ICC profile is created. However, since the color is viewed and determined by the eye, the quality of the color is determined based on various factors and is determined by the experience or subjective view of the person. In this technique, for example, since the final contract proof (proof) which is output from a color-calibrated proofer is input as a wide range of color gamut image, the image area color of the image can be measured by the L*a*b* values. In the case of digital data of the original plate, the digital data is converted into an L*a*b* image using an ICC profile which is created under printing conditions using a CMYK image and colors on the monitor are measured. In this way, it is possible to numerically compare the colors or numerically check the colors. A point or a surface is recorded as a measurement point and a reference color measurement point can be transmitted on-line to the printing operator. Therefore, the client (print ordering party) and the printing company can numerically check or designate colors in safety.

When the printed matter is delivered, the printing company or the advertisement agency stores the delivered printed matter as a sample for about one or two years. The delivered printed matter is stored as color sample data in an electronic storage 53 in order to reduce a large storage space and the time required to find the printed matter during reprint and prevent deterioration of the printed image due to the stored state of the printed image. The L*a*b* values are attached to the stored image and the stored image can be used as a color sample during reprint. Therefore, the electronic storage is a solution to decolorization or a change of color due to ultraviolet rays, temperature, and humidity during the storage of the printed matter.

The image may be transmitted to the client or the agency through a network, in addition to the printing company such that the client or the agency can check the colors during reprint. In addition, when a printed matter for color proof changes to data, it can be used for color proof by the client or the advertisement agency in addition to the company. This technique can be used to construct, for example, an electronic art gallery or an archive of still images or moving images. For example, a painting or a sculpture is input by a CIEXYZ equivalent camera, a video camera, or a spectroscopic camera and a search keyword is attached to the picture or the sculpture so as to facilitate storage or search. Then, data for the picture or the sculpture is stored in a server and is used as electronic art gallery or archive data.

In this case, when data is input by the CIEXYZ equivalent camera or a scanner, it may be input under illumination which is actually used in the art gallery, in addition to the general illumination source D65 or D50. In a case of the spectroscopic type, the color temperature of illumination is converted into the color temperature of illumination which is actually used the art gallery during output and data is displayed under the same illumination.

In various design fields, such as a fashion field and an industrial design field, including the printing industry, there is an increasing demand for the real-time use of image information or printing information in order to increase the processing speed and reduce costs. Therefore, a wide range of color gamut image input device (including a wide range of color gamut video camera), such as an XYZ equivalent camera, a spectroscopic scanner, or a spectroscopic, transmits or receives information about the acceptance of an order, a test, manufacture, and delivery as a video and a still image in real time. In this way, it is possible to process the business at a high speed.

(Modifications)

The present invention is not limited to the above-described embodiments, but various modifications or changes of the present invention can be made. The modifications or changes are also within the technical scope of the present invention.

(1) In the above-described embodiments, the image is input by the wide range of color gamut input device and the image area color measurement is performed for the image. However, the invention is not limited thereto. The image area color measurement may be performed using an input device including the same light source as that in a spectrophotometer which performs spot area color measurement. For example, most of the existing printing spectrophotometers have an aperture size of about 3 mm in order to measure the control strip with a width of about 4.5 mm. However, in this case, when there is a fine pattern or a minute change in the image, when the image has an uneven portion or a shape, or when there is gradation or color unevenness in the image, it is difficult to perform stable color measurement. Therefore, the size of an illumination source or an optical system for image area color measurement may be reduced and a partial image area color measurement device which can measure the L*a*b* value may be used. Preferably, a partial image area color measurement device which can measure the color of an image surface with a size 10 mm or more may be used. Examples of the partial image area color measurement device are illustrated in FIGS. 21 and 22.

Figure 21:
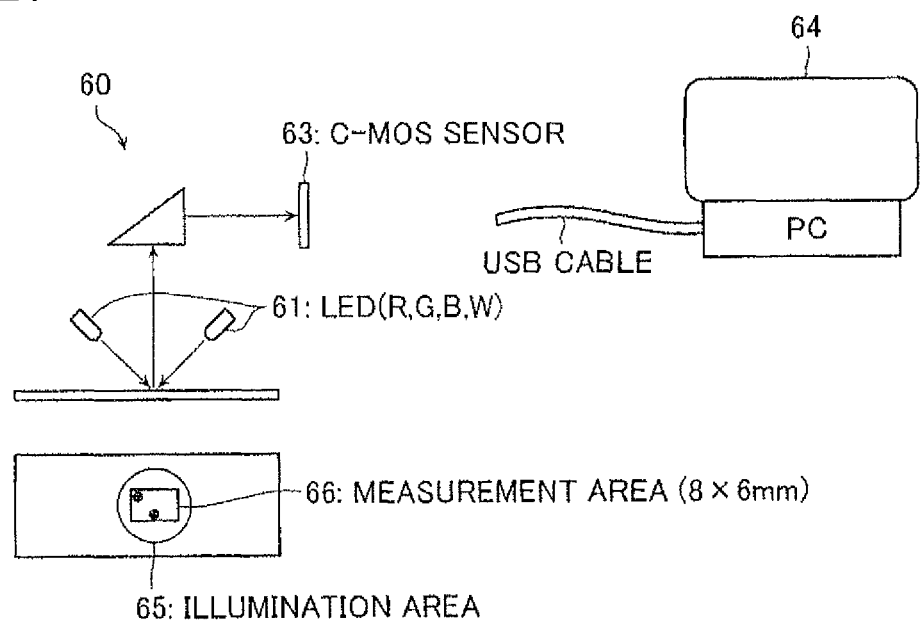
FIG. 21 is a schematic diagram illustrating an example of the structure of a partial image area color measurement device which can be applied to a color information processing apparatus according to an embodiment of the present invention.
Figure 22:
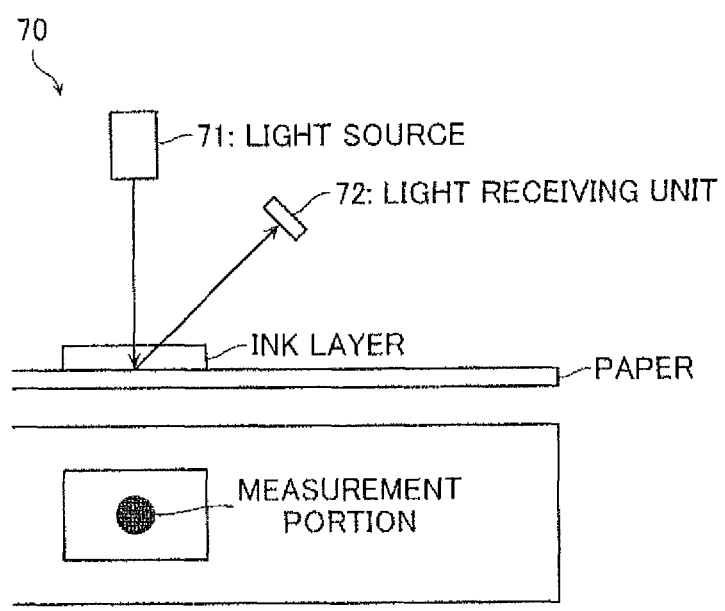
FIG. 22 is a schematic diagram illustrating an example of the structure of a partial image area color measurement device which can be applied to a color information processing apparatus according to an embodiment of the present invention.

A partial image area color measurement device 60 illustrated in FIG. 21 includes, for example, a plurality of LEDs serving as a light source 61, a prism diffraction grating unit 62, and a C-MOS sensor which is a light receiving element 63, and partially measures image area color information in a measurement area 66 of an illumination area 65. A PC 64 processes the color information. In addition, a partial image area color measurement device 70 illustrated in FIG. 22 is a type in which a light receiving unit 72 receives reflected light from a light source 71 to obtain color information.

(2) A plurality of areas of interest may be provided in the image. In this case, different weighting coefficients may be set to the areas of interest to calculate the ink supply amount correction value.

(3) In the above-described embodiments, the medium is, for example, a printed matter and the color material is ink. However, the invention is not limited thereto. For example, the color material is not limited to ink, but may be other dyes, other pigments, or light. The medium can be applied to all media capable of reproducing colors using these color materials.

Examples of the medium include paper, plastic, metal, glass, and an image display device, such as an LCD, a printing, a painting, fashion merchandise, such as fibers, cosmetics, a road, a signboard, a digital signboard, color photographic paper, and coated industrial products, such as vehicles or home appliances. Examples of the color material include oil-based ink, water-based ink, a dye, a pigment, a coating material, paint, a color material for picture, and dyeing water.

(4) In the above-described embodiments, a camera, which is an image area color measurement means, measures the color of the control strip. However, instead of the image area color measurement means, a spot area color measurement means, such as a spectrophotometer which performs spot area color measurement, may be used to measure colors while an evaluation light source emits light. In this case, the image area color measurement means may measure each color of the control strip, the color measurement results may be checked, and calibration may be performed to collect at least one output. For example, the color of each of C, M, Y, and K solid ink portions may be measured and the calibration may be performed based on a difference in color between color measurement devices corresponding to each color.

(5) In the above-described embodiments, the color material correction value is calculated based on the pixels, the pixel groups, and the color difference ΔE which is the difference between the L*a*b* values of the divided portions. However, the color material correction value may be calculated based on any one of the value of L, the value of a, and the value of b or a combination of two of the values.

(6) In the above-described embodiments, four color inks, that is, C, M, Y, and K inks are used as the color material. However, the invention is not limited thereto. A color material other than C, M, Y, and K inks, for example, a specific color ink may be used. (7) In the above-described embodiments, the PPF file, which is the reference data, has information about the halftone dot % (halftone dot percent) for each portion or each color of the image. However, instead of the halftone dot percent, data including information about the density of the color material may be used as the reference data.

DESCRIPTION OF REFERENCE NUMERALS 1 color adjustment apparatus
2 camera
3 evaluation light source
4 image processing means
5 area setting means
6 L*a*b* value calculation means
7 ΔE calculation means
8 average ΔE calculation means
9 CMYK correction amount calculation means
10 image simulation means
11 image display means
100 printing press
110Y yellow printing unit
111Y plate cylinder
112Y blanket cylinder 113Y impression cylinder
114Y ink fountain
115Y ink supply roller
116Y dampening solution device
117Y dampening solution roller
110M magenta printing unit
110C cyan printing unit
110K black printing unit
P printing sheet
I1 to I4 image
C1 to C5 color chart
S1 control strip
Z1 to Z13 ink fountain adjustment area
L cutting margin

The invention claimed is:

1. A color information processing method comprising:
inputting reference data including color information about each pixel or each pixel group of a reference medium and evaluation target data including color information about each pixel or each pixel group of an evaluation medium by an input means;
performing an image matching process of image matching the input reference data and evaluation target data by an image processing means such that pixel levels thereof correspond to each other, the image matching process including positioning images of the reference medium and the evaluation medium on a common coordinate axis of the images and removing a relative size difference and relative distortion between the images of the reference medium and the evaluation medium;
calculating an evaluation result by a calculation means, for each range corresponding to each ink key which controls an ink amount in the reference medium and the evaluation medium, by comparing the color information of both the reference data and the evaluation target data about each pixel or each pixel group based on the reference data and the evaluation target data in a specific area which is a unit of evaluation; and
adjusting a printing color of a printing machine based on the evaluation result by an image processing means.

2. The color information processing method according to claim 1,
wherein the calculation means calculates a color difference by comparing the color information of both the reference data and the evaluation target data about each pixel or each pixel group based on the reference data and the evaluation target data in the specific area set in advance, and performs an averaging process to calculate an average evaluation result for the specific area.

3. The color information processing method according to claim 1,
wherein at least one of the color information of the reference data and the color information of the evaluation target data is an RGB value or a CIEXYZ value as a color measurement result obtained by measuring a color of a printed matter, a light emitting surface, or an object in a pixel unit or a pixel group unit using the input means.

4. The color information processing method according to claim 3,
wherein the reference data and the evaluation target data include an image of a control strip including a solid patch of a color material,
the color measurement result includes a color measurement result of the control strip, and
the image processing means adjusts the printing color of the printing machine so as to make a color of the control strip in the evaluation target data close to a color of the control strip in the reference data.

5. The color information processing method according to claim 1,
wherein the reference data are stored in a storage means, and the calculation means calculates the evaluation result for each of a plurality of evaluation media based on the reference data read from the storage means and the evaluation target data of each evaluation medium.

6. A color information processing apparatus comprising:
an input means for inputting reference data including color information about each pixel or each pixel group of a reference medium and evaluation target data including color information about each pixel or each pixel group of an evaluation medium;
an image processing means for performing an image matching process of image matching the input reference data and evaluation target data such that pixel levels thereof correspond to each other, the image matching process including positioning images of the reference medium and the evaluation medium on a common coordinate axis of the images and removing a relative size difference and relative distortion between the images of the reference medium and the evaluation medium; and
a calculation means for calculating an evaluation result, for each range corresponding to each ink key which controls an ink amount in the reference medium and the evaluation medium, by comparing the color information of both the reference data and the evaluation target data about each pixel or each pixel group based on the reference data and the evaluation target data in a specific area which is formed by a plurality of pixels and is a unit of evaluation,
wherein the image processing means is further for adjusting a printing color of a printing machine based on the evaluation result.

7. The color information processing apparatus according to claim 6,
wherein the calculation means calculates a color difference by comparing the color information of both the reference data and the evaluation target data about each pixel or each pixel group based on the reference data and the evaluation target data in the specific area set in advance, and performs an averaging process to calculate an average evaluation result for the specific area.

8. The color information processing apparatus according to claim 6,
wherein the input means measures a color of a printed matter, a light emitting surface or an object in a pixel unit or a pixel group unit to obtain at least one of the color information of the reference data and the color information of the evaluation target data as a color measurement result in an RGB value or a CIEXYZ value.

9. The color information processing apparatus according to claim 8,
wherein the reference data and the evaluation target data include an image of a control strip including a solid patch of a color material,
the color measurement result includes a color measurement result of the control strip, and
the image processing means adjusts the printing color of the printing machine so as to make a color of the control strip in the evaluation target data close to a color of the control strip in the reference data.

10. The color information processing apparatus according to claim 6, further comprising:
a storage means for storing the reference data,
wherein the calculation means calculates the evaluation result for each of a plurality of evaluation media based on the reference data read from the storage means and the evaluation target data of each evaluation medium.

* * * * *